(12) United States Patent
Shimazu et al.

(10) Patent No.: US 8,365,609 B2
(45) Date of Patent: Feb. 5, 2013

(54) MECHANICAL-QUANTITY MEASURING DEVICE

(75) Inventors: Hiromi Shimazu, Kashiwa (JP);
Hiroyuki Ohta, Tsuchiura (JP); Yohei Tanno, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/177,185

(22) Filed: Jul. 6, 2011

(65) Prior Publication Data

US 2011/0259112 A1 Oct. 27, 2011

Related U.S. Application Data

(62) Division of application No. 11/709,075, filed on Feb. 20, 2007, now Pat. No. 7,992,448.

(30) Foreign Application Priority Data

Mar. 29, 2006 (JP) .................................. 2006-089834

(51) Int. Cl.
*G01L 1/18* (2006.01)
*G01L 1/22* (2006.01)

(52) U.S. Cl. .......................................... 73/777; 73/775
(58) Field of Classification Search .................... 438/48; 73/727, 777; 338/5, 6
See application file for complete search history.

(56) References Cited

U.S. PATENT DOCUMENTS

| | | | | |
|---|---|---|---|---|
| 3,739,644 A | * | 6/1973 | Underwood et al. | ........... 73/721 |
| 4,246,908 A | | 1/1981 | Inagaki et al. | |
| 4,576,052 A | | 3/1986 | Sugiyama | |
| 6,422,088 B1 | * | 7/2002 | Oba et al. | ........................ 73/754 |
| 7,293,466 B2 | * | 11/2007 | Ohta et al. | ...................... 73/777 |
| 7,694,586 B2 | * | 4/2010 | Rey | ........................ 73/862.042 |
| 7,770,462 B2 | * | 8/2010 | Ohta et al. | ...................... 73/777 |
| 2006/0043508 A1 | | 3/2006 | Ohta et al. | |

FOREIGN PATENT DOCUMENTS

| | | |
|---|---|---|
| JP | 56-060066 A | 5/1981 |
| JP | 07-270109 | 10/1995 |
| JP | 10-213503 A | 8/1998 |
| JP | 2001-304997 A | 10/2001 |
| JP | 2005-114443 | 4/2005 |

* cited by examiner

*Primary Examiner* — Lisa Caputo
*Assistant Examiner* — Punam Roy
(74) *Attorney, Agent, or Firm* — Kilpatrick Townsend & Stockton LLP

(57) ABSTRACT

A mechanical-quantity measuring device capable of measuring a strain component in a specific direction with high precision is provided.
At least two or more pairs of bridge circuits are formed inside a semiconductor monocrystal substrate and a semiconductor chip, and one of these bridge circuits forms a n-type diffusion resistor in which a direction of a current flow and measuring variation of a resistor value are in parallel with a <100> direction of the semiconductor monocryastal silicon substrate, and an another bridge circuit is composed of combination of p-type diffusion resistors in parallel with a <110> direction.

8 Claims, 26 Drawing Sheets

[-1-10]
[-110]

(a)

(b)

SENSITIBITY STABILIZED AREA — DISTANCE FROM CHIP END ≥ 49 × √CHIP THICKNESS

MECHANICAL-QUANTITY MEASURING DEVICE

CROSS-REFERENCE TO RELATED APPLICATION

This application is a divisional application of U.S. patent application Ser. No. 11/709,075, filed on Feb. 20, 2007, which claims priority from Japan Patent Application No. 2006-089834, filed on Mar. 29, 2006, the content of which is hereby incorporated by reference into this application.

TECHNICAL FIELD OF THE INVENTION

The present invention relates to a device capable of measuring a mechanical quantity of an object and a system using this device.

BACKGROUND OF THE INVENTION

As a technique for measuring a deformation (strain) of a measuring object, a technique has been known in which a metallic foil strain gauge is used by making use of the fact that a resistance value of the metallic foil changes by a strain. This is a technique, in which this strain gauge is adhered to the measuring object, and a length of the metallic foil is changed according to the strain of the measuring object, and as a result, and by detecting the changing resistance value of the metallic foil, the strain of the measuring object can be measured.

Further, since the resistance value of the metallic foil has a sensitivity not only for the strain but also for the temperature, as a technique for offsetting a measurement error caused by temperature change, a strain gauge in which a metallic foil resistor having sensitivity for strain and a wheatstone bridge circuit for performing temperature compensation is formed on the same substrate is disclosed in Japanese Patent Application Laid-Open Publication No. 07-270109 (Patent Document 1). Note that, in the following, the wheatstone bridge is referred to as a bridge.

Further, since the power consumption of these circuits is large, if they are battery-operated, there has been a problem that the battery runs out promptly. Hence, as disclosed in Japanese Patent Application Laid-Open Publication No. 2005-114443 (Patent Document 2), a technique in which a strain is detected from change in resistance value of a diffusion resistor of high resistance, formed on the semiconductor substrate using semiconductor manufacturing technique, is developed.

SUMMARY OF THE INVENTION

In measuring a torque and an axial force of the rotation axis simultaneously, it is theoretically possible to adhere two pieces of strain measuring chips to the rotation axis and do the measurement, as written in Patent Document 2 and the like. However, if two pieces of the strain measuring chips are adhered respectively so as to measure shearing strain and normal strain, the measurement is adversely affected by variation of two chips generated in the adhering, therefore, there is a problem that this technique is not suited for the measurement of high accuracy.

Similarly, if two strain measuring chips are adhered respectively so as to measure shearing strain and normal strain, in reality, it become easy to generate an error in the adhering angle, therefore, there is a problem that this technique is not suited for the measurement of high accuracy.

And similarly, if a plurality of strain measuring chips is adhered in order to perform the strain measurement of each axial direction of the measured object in which a multiaxial strain is generated, also, the same problem occurs.

Further, if a plurality of strain measuring chip is adhered for the aforementioned purpose, since a certain amount of area is required, each places where strain components measure respectively become mutually separated, therefore, the chip was unable to be used for measuring a state of strain in stress concentration field.

Therefore, an object of the present invention is to provide a mechanical-quantity measuring device with few variation in sensor sensitivity and capable of measuring the stain in a specific direction with high precision, and a system using this device.

Further, another object of the present invention is to provide a mechanical-quantity measuring device capable of measuring in-plane two directions of the normal strain and shear strain in the stress concentration field and measuring in the multiaxial strain field, and a system using this device.

Further, another object of the present patent application is to provide a mechanical-quantity measuring device capable of obtaining measuring result with small background noise even at a place with plenty of external noises, and a system using this device.

The above described objects can be achieved by forming at least two set of bridge circuits within a semiconductor chip consisting of one semiconductor monocrystal. In addition, by having the following characteristics, each of the aforementioned problems can be solved.

(1) <Example 1, Torque and Axial Force Measuring Chip> This example is characterized by that, to measure a torque and an axial force of the rotation axis with high precision, preferably at least one of the above described bridge circuit has an n-type diffusion resistor in which a <100> direction in the semiconductor monocrystal substrate and a direction of electric current are in parallel, and another bridge circuit has a p-type diffusion resistor in which a <110> direction and a direction of electric current are in parallel. As a result, for example, if the mechanical-quantity measuring device is adhered so as to match the <110> direction to the direction of rotation axis, a strain direction desired to obtain and the direction in which the sensor sensitivity become maximum can be matched, and therefore, it is possible to measure the torque and axial force simultaneously with high sensitivity.

Here, since two sensors are formed on the same silicon substrate, a diffusion layer is provided separately from the diffusion layer composing the bridge circuit of the sensor so as not to mutually interfere. That is, taking a case where the semiconductor monocrystalline substrate is a p-type for example, an n-type diffusion layer is preferably formed so as to surround a p-type diffusion layer in the vicinity of the bridge circuit composed of the p-type diffusion resistor, in order to improve measuring accuracy. By this, variation of sensor installation and variation occurring at the sensor adhering can be prevented, so that the highly precise measurement can be realized.

(2) <Example 2, Biaxial Separation Chip> To measure the multiaxial strain field with high precision, the bridge circuit is composed of a combination of two diffusion resistors with high sensitivity for strain and two diffusion resistors with low sensitivity for strain. Here, the diffusion resistor (impurity diffusion layer) with high sensitivity for strain is, for example, an n-type diffusion resistor in which the direction of electric current is in parallel with the <100> direction or a p-type diffusion resistor in which the direction of electric current is in parallel with the <110> direction, while the diffusion resistor (impurity diffusion layer) with low sensitivity for strain is, for example, a p-type diffusion resistor in which the direction of electric current is in parallel with the <100> direction or an n-type diffusion resistor in which the direction of electric current is in parallel with the <110> direction. And, the direction of electric current is preferably made into the longitudinal direction of the diffusion resistor.

The p-type diffusion resistor in which the <100> direction is a longitudinal direction has no sensitivity for stain in each direction, and the n-type diffusion resistor in which the <100> direction is a longitudinal direction has a high sensitivity for strain in the <100> direction. And the sensitivity for strain can be greatly different between [100] direction, which is the direction of electric current, and [010] direction, which is orthogonal to the [100] direction. As a result, in the biaxial strain field, since the increment of the resistance value to be obtained differs depending on whether the longitudinal direction of the n-type diffusion resistor is made into the [100] or the [010], the biaxial strain fields can be detected separately. A bridge circuit composed of combination of two pieces of the n-type diffusion resistors in which the direction of electric current in the semiconductor monocrsytalline substrate is in parallel with the <100> direction and two pieces of the p-type diffusion resistors in which the direction of electric current is in parallel with the <100> direction, is preferable.

Hence, the example is characterized by that, the longitudinal direction of the n-type diffusion resistor with high sensitivity for strain of the first bridge circuit and the longitudinal direction of the n-type diffusion resistor with high sensitivity for strain of the second bridge circuit are in almost orthogonal arrangement. Further, the longitudinal direction of the n-type diffusion resistor of each bridge circuit is preferably aligned to the same direction.

Here, in the above description, though an explanation has been made such that the direction of electric current almost matches the longitudinal direction of the pattern of the impurity diffusion layer, if the direction of electric current matches the above described direction, the same effect can be obtained. Note that, when the direction of electric current and the longitudinal direction of the pattern of the impurity diffusion layer are allowed to almost match, the resistance value of the diffusion layer can be increased, and therefore, power consumption can be reduced further. Hence, in the following, a description will be made on the case where the direction of electric current is made into the longitudinal direction of the pattern of the diffusion layer.

Further, more preferably, the arrangement of the n-type impurity diffusion layer composing the first bridge circuit and the arrangement of the n-type impurity diffusion layer composing the second bridge circuit are desirably axially symmetrical. By allowing both arrangements to be axially symmetrical, the longitudinal direction only of the diffusion layer can be allowed to be orthogonal under quite the same arrangement condition, and therefore, even when the biaxial strain field is separated and detected, the highly precise measurement can be performed.

Further, more desirably, the n-type impurity diffusion layer composing one wheatstone bridge is arranged at a distance closer to the center point of the chip than the p-type impurity diffusion layer composing the wheatstone bridge. Since the vicinity of the center point of the chip is most hard to be affected by the strain release of the chip ends, by arranging the n-type impurity diffusion layer having sensitivity for strain in this center point vicinity, the measurement with good accuracy can be performed.

Further, more preferably, another diffusion layer apart from the diffusion layer composing the sensor is formed. That is, taking the case where the semiconductor monocrystalline substrate is a p-type for example, an n-type impurity diffusion layer is formed so as to surround a p-type impurity diffusion layer composing a wheatstone bridge, and this n-type diffusion layer is connected to a plus side of the wheatstone bridge. By this, the impurity diffusion layers of the p-type and the n-type can be prevented from electrically interfering each other, so that the highly precise measurement can be performed.

(3) <Example 3, Adjusting Resistor> Further, more preferably, p-type diffusion resistors with relatively low resistance for adjustment of resistance value are connected in series to the p-type diffusion layer in the bridge circuits. That is, the number of lead wires led from the end portion of the p-type diffusion resistor to the outside of the bridge circuit is made larger than the number of lead wires led from the end portion of the n-type impurity diffusion resistor to the outside of the bridge circuit, and actual values of resistance of the p-type impurity diffusion resistor and the n-type impurity diffusion resistor are measured, then the lead wires to be used for measurement. By forming the adjusting resistor in this manner, it is possible to correct an error occurred in manufacturing of each diffusion layer resistance value caused by difference in the forming process of the p-type diffusion layer and the n-type diffusion layer. As a result, the advantages that the output offset of the bridge circuit can be reduced and the temperature dependency can be suppressed, are obtained.

(4) <Example 4, Polysilicon Resistor Bridge> Similarly, to measure the multiaxial strain field with high precision, the wheatstone bridge circuit composed of the impurity diffusion resistors are provided at least two sets on the same semiconductor substrate, and the two sets of the wheatstone bridge circuits are made to include a p-type impurity diffusion register in which the direction of electric current and measuring the variation of the resistance value is in parallel with the direction <100> of the semiconductor monocrystalline substrate, and a polysilicon wiring resistor.

The p-type diffusion resistor in which the <100> direction is a longitudinal direction has no sensitivity for the stain of each direction, and the polysilicon resistor has a high sensitivity in the longitudinal direction only. Hence, the direction in which the current of the polysilicon wiring resistor composing the first wheatstone bridge flows and the variation of the resistance value is measured and the direction in which the current of the polysilicon wiring resistor composing the second wheatstone bridge flows and the variation of the resistance value is measured are arranged to be orthogonal to each other. By arranging the polysilicon wiring resistors in this manner, the measurement of the in-plane biaxial normal strain can be performed.

Further, more desirably, the P-type diffusion resistors with relatively low resistance for adjustment of resistance value are connected in series to the p-type diffusion layer in the bridge circuits. Since the forming processes of the p-type diffusion layer and the polysilicon wiring resistor are different, even if they are designed to be the same resistors in the point of view of circuit-design, the resistance value of each diffusion layer is often different at the actual device. Hence, in this manner, the adjusting resistor is inserted into the p-type diffusion layer, therefore, fine adjustment of the resistance value can be performed by changing position of the connecting terminal to be connected. As a result, the advantages that the output offset of the bridge circuit can be reduced and the temperature dependency can be suppressed, are obtained.

(5) <Example 5, FIG. 17, Triaxial Separation Chip> Further, to measure all the in-plane strain states including shear strain, the wheatstone bridge circuit composed of the impurity diffusion resistors is provided at least three sets on the same semiconductor substrate, and one set of them composed of the p-type impurity diffusion resistor in which the direction of electric current and measurement of the variation of the resistance value is in parallel with the <110> direction of the semiconductor monocrystalline substrate. Further, other two sets of the wheatstone bridge circuits composed of the combination of the p-type impurity diffusion resistor in which the direction of electric current and measurement of the variation of the resistance value is in parallel with the <100> direction of the semiconductor monocrystalline substrate and the n-type impurity diffusion resistor in which the direction of electric current and measurement of the variation of the resistance value is in parallel with the <100> direction of the semiconductor monocrystalline substrate. By this, in addition to the in-plane biaxial normal strain, the shear strain can be also measured, and therefore, all the in-plane strain state adhered with the mechanical-quantity measuring device can be grasped.

<Example 5, FIG. 17, Chip attached with Temperature Sensor> Further, to measure the strain with high precision even when the temperature changes, a temperature sensor composed of PN junction is provided in the same semiconductor substrate as the strain sensor in the mechanical-quantity measuring device aforementioned (1) to (4). As a result, in addition to the temperature correcting functions by the bridge circuit of the strain sensor, strict temperature correction can be further performed.

(6) <Example 6, FIG. 20, Chip Attached with Strip Sensor> To improve reliability of the measurement, apart from the strain sensor, diffusion layers are provided on the four corners in the same semiconductor substrate. The mechanical-quantity measuring device adhered to the measuring object sometimes happens to be stripped off from the chip edge. Hence, according to the present example, the occurrence of this stripping off can be detected in the diffusion layers at the four corners, and therefore, the highly precise measurement can be performed.

(7) <Example 7, Chip Attached with Amplifier> To achieve the measurement even in the case where the external noise is loud, an amplifier circuit for amplifying the signal outputted from a strain detection unit is provided on the same semiconductor substrate with the strain sensor. Since the output from the bridge circuit can be input to the amplifier provided at close position to the bridge circuit on the silicon substrate, the mechanical-quantity measuring device with resistant to external noise can be provided. That is, since the strain sensor using the impurity diffusion layer can be fabricated by the semiconductor manufacturing process, therefore, the advantage that the bridge circuit and the amplifier circuit which are the combination of the impurity diffusion layers can be formed on the same semiconductor chip is obtained. Hence, the output of the bridge circuit can be directly amplified on the semiconductor substrate, so, is hard to catch external noise, therefore, the mechanical-quantity measuring device with resistant to noise and capable of performing the highly precise measurement can be provided. Further, since the bridge circuit can be formed by the semiconductor process, the bridge circuit itself can be miniaturized up to a micron size, therefore, the bridge circuit with resistant to external noise is provided because a magnetic flux is difficult to pass through inside the bridge. As a result, the mechanical-quantity measuring device with resistant to noise and capable of performing the highly precise measurement can be provided.

The strain detection unit composed of the impurity diffusion resistors and the amplifier for amplifying the signals outputted from the strain detection unit are preferably provided at least two pairs on the same semiconductor substrate.

Further, desirably, the longitudinal direction of the feedback resistor composing the amplifier, if connected to the same bridge circuit, is all directed to the same direction. As a result, even in the case where the feedback resistor of the amplifier has strain dependency, the feedback resistor hardly affected by the strain in measurement of a two axial complicated strain field.

Further, desirably, the longitudinal direction of all feedback resistors composing the amplifier is consolidated to be in parallel or vertical with the longitudinal direction of the impurity diffusion layers composing the strain detection units. By this, the strain in the measurement direction is loaded also on the feedback resistor of the amplifier, and therefore, even in measuring the biaxial complicated strain field, the strain hardly affects the measurement process where the strain field separated into biaxial components.

Further, desirably, the feedback resistors composing the amplifier are all directed to the same direction, and the distances between the ends of the longitudinal directions of a feedback resistor group and the chip ends are made to be equal. By this, the influences of the release of the strains of the chip ends are equally received by all the feedback resistors, and therefore, the advantage that the highly precise measurement can be performed, is obtained.

Further, desirably, the feedback resistors composing two sets of amplifiers are all directed to the same direction, and the feedback resistor groups composing two sets of amplifiers are arranged line symmetrical. As a result, by arranging the feedback resistors composed of the multicrystalline silicon resistors of two operational amplifiers connected to the bridge circuit approximately line-symmetrical, the influence of strain for the two multicrystalline silicons can be the same, thereby, the effect of the strain in amplifier is offset, and the highly precise measurement is achieved.

Further, desirably, the feedback resistors composing two sets of amplifiers are all directed to the same direction, and the feedback resistor groups composing two sets of amplifiers are arranged rotation-symmetrical with the center of the chip as rotation axis. In this case, the bridge circuit 5 and the amplifier 21 are made into quite equivalent structures of the bridge circuit 4 and the amplifier 20 turned 90 degrees, therefore, an effect that the design thereof is easy is obtained.

(8) <Example 12, Arrangement Position of Sensor> In the mechanical-quantity measuring device aforementioned (1) to (6), the strain detection unit is arranged such that its distance from the chip end is 49×(chip thickness)$^{0.5}$ μm or more and comes inner side of the chip. By this, even in the case where the mechanical-quantity measuring device 1 composed of the semiconductor chip is adhered to the measured object, the variation in measurement is suppressed by lack of receiving the influences from the chip ends, therefore, the highly precise measurement with excellent reproducibility can be performed.

The present invention can provide a mechanical-quantity measuring device capable of contributing to solve any of the above described problems. That is, according to the present invention, even when the measured object has stress concentration, the advantage that a strain state of the fine area can be grasped, is obtained. Further, according to the present invention, the highly precise strain measurement of the multiaxial strain field can be also performed. Further, according to the present invention, an error occurred when the mechanical-quantity measuring device is adhered can be reduced to the minimum. Further, even at a place where the external noise is loud, the strain can be measured so as to make a background noise small. And, by using differential amplifiers as amplifiers, a noise tolerance of the mechanical-quantity measuring device can be improved.

Further, since these mechanical-quantity measuring devices are formed on the semiconductor chips, they can be fabricated by using the semiconductor process, and therefore, they can be mixed-loaded with another digital circuit such as a CPU, memory circuit, and communication circuit. Further, there is the effect that manufacturing with high precision, low cost, and large supply can be provided by using the semiconductor manufacturing facility.

BRIEF DESCRIPTIONS OF THE DRAWINGS

DESCRIPTIONS OF THE PREFERRED EMBODIMENTS

Embodiments of the present invention will be described below with reference to the accompanying drawings.

In the present invention, as a strain sensitive resistor body, an impurity diffusion resistor or a poly silicon resistor is provided, and consideration is made for the relationship between crystal orientation of silicon single crystal and piezoresistance coefficient, and also for the relationship between the current direction of the impurity diffusion resistor and the measuring direction of strain so as to obtain desired characteristics. In the following, Miller's index is used for the notation of the crystal face and crystal orientation of a silicon substrate 2.

In notation using Miller's index, when a minus direction is designated, a bar is attached upon the number, but in the present specification, the number attached with the bar is written as [−110] attached with "−" for convenience. Further, when a specific surface or direction is expressed, ( ) and [ ] are used respectively, and when an equivalent surface or direction is expressed within a monocrystalline silicon substrate, { } and < > are used respectively. Further, in the present specification, a current is let flow in the longitudinal direction of an impurity diffusion layer, and the variation of the resistance value in direction of the current flow is measured. The notation referred to as the longitudinal direction of the resistance indicates a direction in which the current is let flow and measurement of the variation of a resistance value is performed.

[First Embodiment]
<Torque and Axial Force Measuring Chip>

Figure 1:
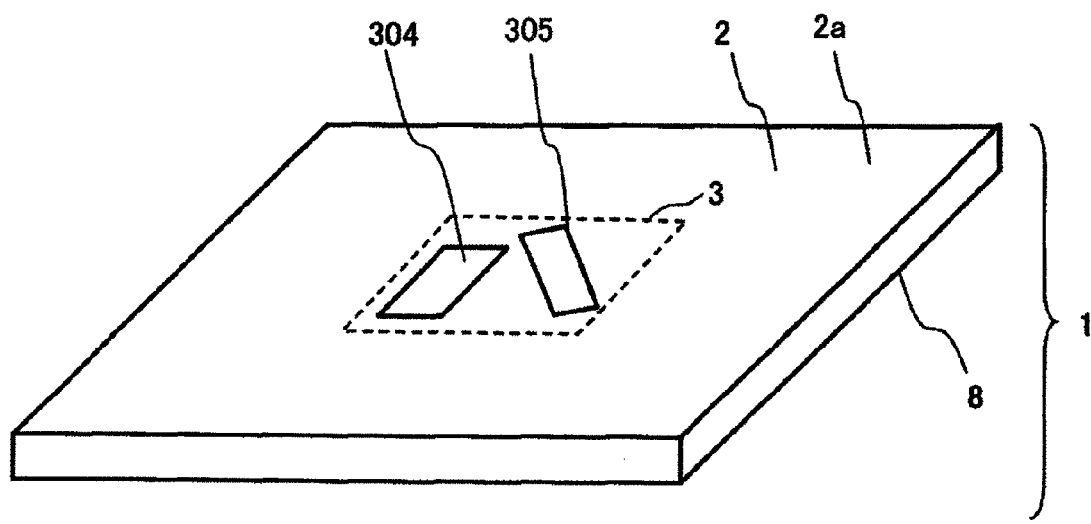
FIG. 1 is a schematic view showing the outline of a mechanical-quantity measuring device according to a first embodiment of the present invention.

A first embodiment in the present invention will be described by using FIGS. 1 to 8. The main part of a mechanical-quantity measuring device according to the present embodiment is shown in FIG. 1.

In the mechanical-quantity measuring device 1 of the present embodiment shown in FIG. 1, a strain detection unit 3 is provided on a main surface 2a of a silicon substrate 2 composed of the same monocrystalline semiconductor substrate in which the surface is {001}, and the strain detection unit 3 is provided with at least two wheatstone bridge circuits (hereinafter, referred to as bridge circuit) 304 and 305.

Figure 2:
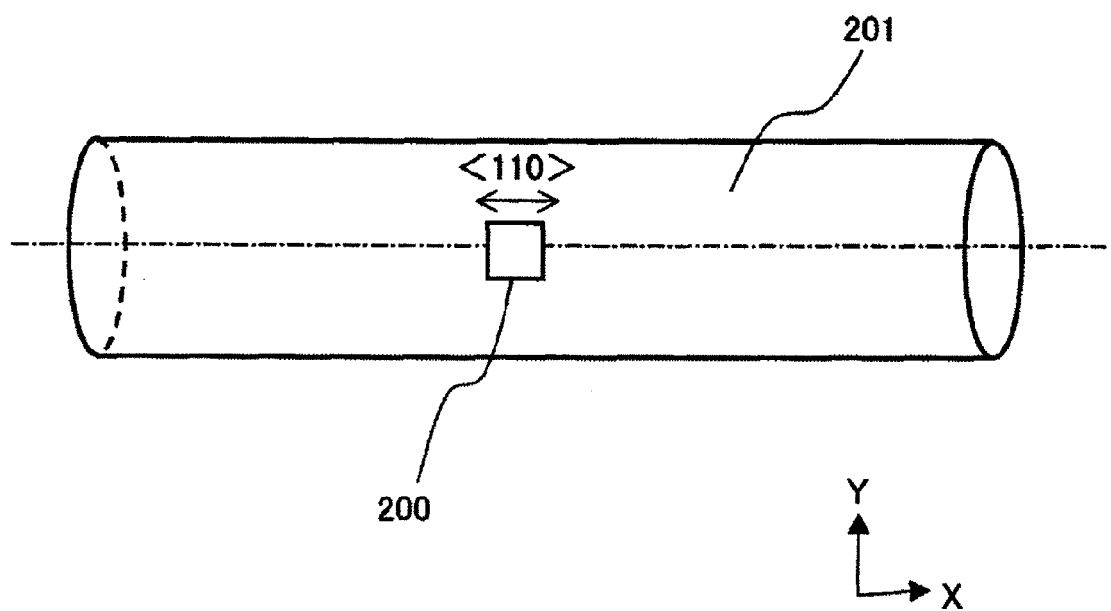
FIG. 2 is a view showing an example of how to use in the first embodiment of the present invention.

Note that, though not illustrated, wirings for taking out electrical signals from the bridge circuits 304 and 305, pads, insulating materials for insulating these component parts, and the like are formed as occasion arises. In the present embodiment, the silicon substrate 2 and a thin film group formed on the silicon substrate 2 are collectively referred to as the mechanical-quantity measuring device 1. This mechanical-quantity measuring device 1, as shown in FIG. 2, is attached to a rotation axis 201 of a body of rotation which is the measured object, so that the measurement of torque and an axial force can be performed. In this case, as shown in FIG. 2, the mechanical-quantity measuring device 1 may be attached so that <110> of a crystal axial direction of the silicon substrate 2 is in parallel with the center axis of the rotation axis 201, or <100> of the crystal axial direction of the silicon substrate 2 is in parallel with the center axis of the rotation axis. Further, the mechanical-quantity measuring device 1 may be adhered or embedded on the surface of the measured object. And, the silicon substrate 2 preferably has a {001} on the surface because of its characteristics.

Figure 3:
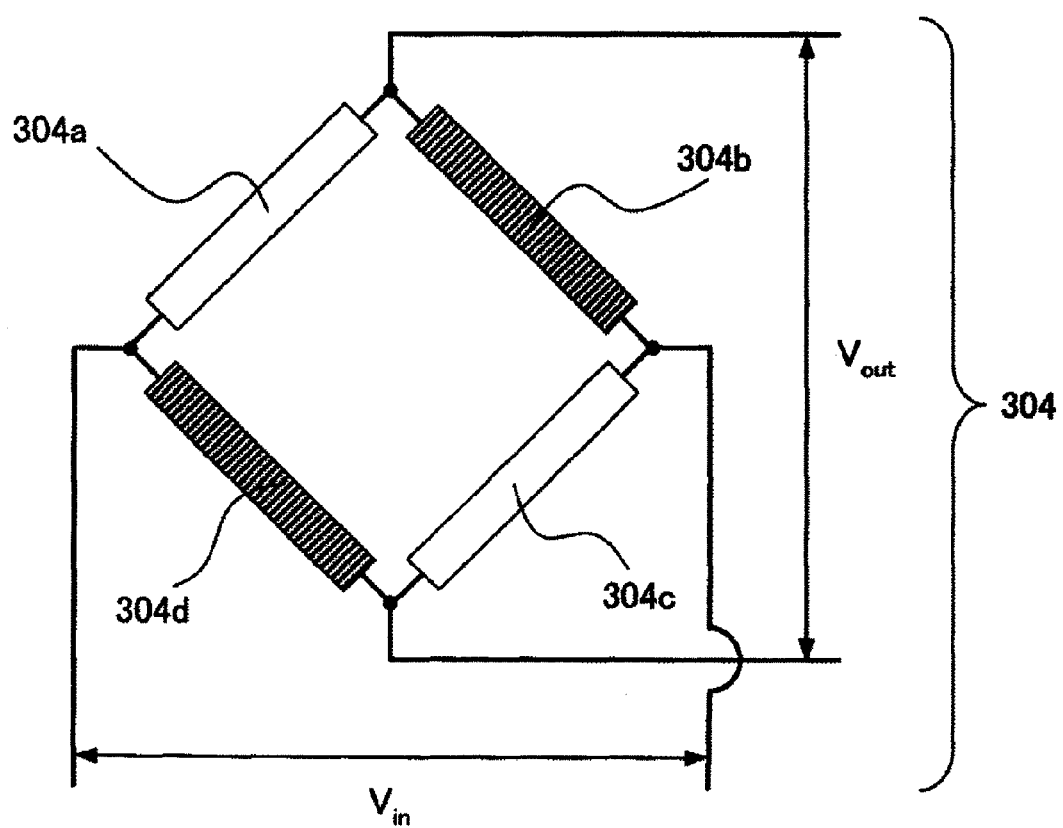
FIG. 3 is a view showing a connecting state of diffusion resistors composing a bridge circuit of the mechanical-quantity measuring device according to the first embodiment of the present invention.

The bridge circuit 304, as shown in a wiring diagram of FIG. 3, is formed by connecting four pieces of impurity diffusion resistors 304a, 304b, 304c, and 304d in this order, and is mainly used for the measurement of axial force as a torque sensor. A voltage is applied between the impurity diffusion resistor 304a and 304d or between 304b and 304c, and the signal is taken out from between the impurity diffusion resistor 304a and 304b or between 304c and 304d. Similarly, the bridge circuit 305 is formed by connecting four impurity diffusion resistors 305a, 305b, 305c, and 305d in this order, and is used mainly for the measurement of torque.

Figure 4:
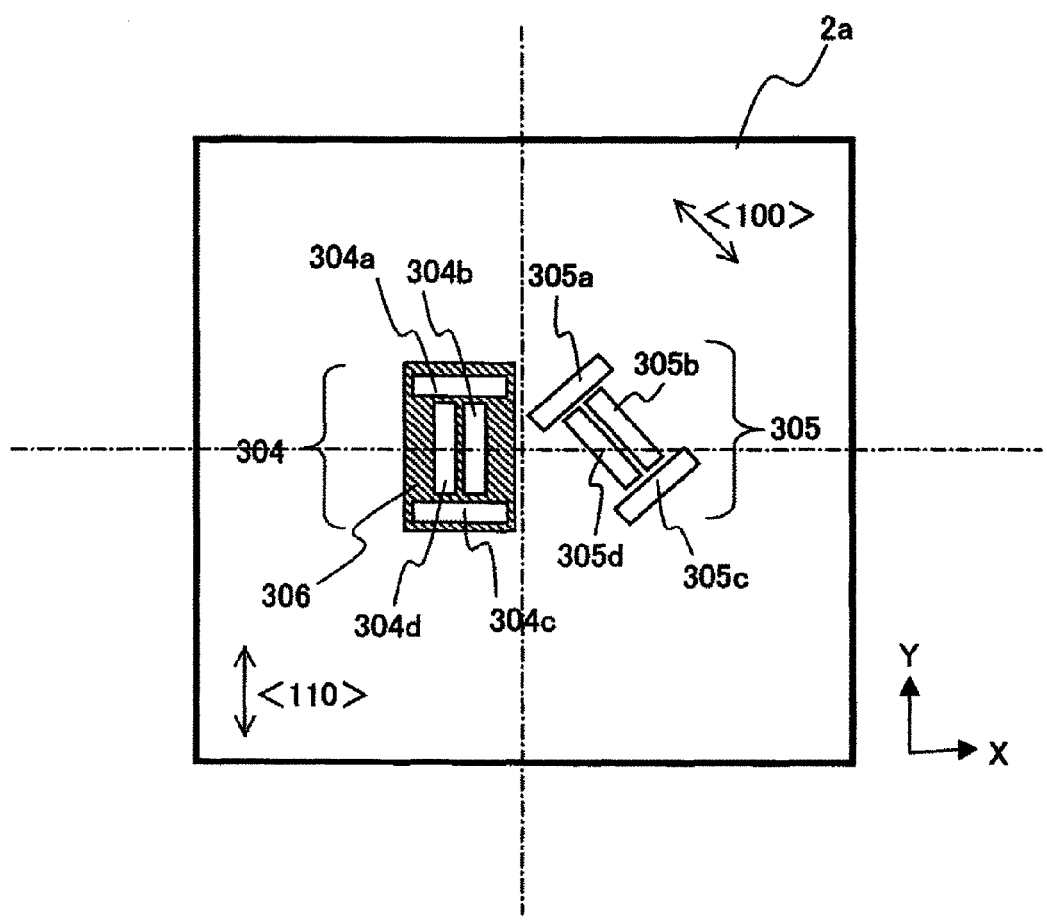
FIG. 4 is a schematic view showing the detail of the mechanical-quantity measuring device according to the first embodiment of the present invention.

A layout plan of the impurity diffusion resistors in two bridge circuits 304 and 305 is shown in FIG. 4. The bridge circuit 304 composed of four p-type impurity diffusion layers formed such that the direction of electric current is in parallel with the direction <110>. In FIG. 4, as an example, the bridge circuit 304 is formed by a combination of the impurity diffusion resistors 304a and 304c arranged in the direction in parallel with a [110] and a combination of the impurity diffusion resistors 304b and 304d arranged in the direction in parallel with a [-110]. That is, the impurity diffusion resistors 304a, 304c and 304b, 304d are arranged to be orthogonal to one another in the longitudinal direction. Further, the resistance value of each diffusion resistor is matched as accurately as possible.

Incidentally, here, for example, the notation such as "in the direction (including [-110] which is a reverse direction. The same holds true with the following) in parallel with the direction [110]" has been used, even when the direction deviates from the [110] direction, if the deviation is within the range of ±10 degrees, approximately the same effect can be expected, and therefore, in the present invention, that direction is regarded as being in parallel with the [110] direction. This holds true with other directions. If the direction further deviates outside of this range, a sensitivity for strain rapidly comes down, and therefore, an impurity diffusion layer taking the angle range of ±10 degrees from the [100] direction as the longitudinal direction is preferably formed. Note that, the direction of the electric current indicates a direction which joins a position connected with a line for inputting the current into the impurity diffusion layer and a position connected with a line for outputting the current, in the case where the impurity diffusion layer is formed in a simple shape area such as a rectangle.

On the other hand, the bridge circuit 305 composed of four pieces of the n-type impurity diffusion layers formed such that the direction of the electric current is in parallel with the <100> direction. In FIG. 4, the bridge circuit 305 is formed by a combination of the impurity diffusion resistors 305a and 305c arranged in the direction in parallel with the direction [100] and the impurity diffusion resistors 305b and 305d arranged in the direction in parallel with the [010] direction. That is, the impurity diffusion resistors 305a, 305c and 305b, 305d are arranged so as to be orthogonal to one another in the longitudinal direction.

Further, in the vicinity of the bridge circuit 304, a well 306 is configured, and though not illustrated, a wiring is drawn out so as to be electrically connected to the well 306.

Further, at this time, the impurity diffusion resistors 305a, 305c and 305b, 305d and the impurity diffusion resistors 304a, 304c and 304b, 304d composing the bridge circuits are preferably exactly equal in resistance value, respectively, and therefore, are preferably arranged thickly in order to uniformalize variation in ion implantation concentration as much as possible. That is, the distance between each diffusion resistor is preferably made shorter rather than the length of the diffusion resistor.

Like the bridge circuit 304, by forming the bridge circuit by a combination of the impurity diffusion resistors 304a and 304c arranged in the direction in parallel with the [110] direction and the impurity diffusion resistors 304b and 304d arranged in the direction in parallel with the [-110] direction, the temperature correction can be made even when environmental temperature changes, so that the highly precise measurement can be performed. Further, in this case, a large sensitivity can be obtained for the strains of XY directions in parallel with and vertical to the <110> direction, that is, the [110] direction and the [-110] direction. Hence, as shown in FIG. 2, if the bridge circuit 304 is attached so that the axial center of the rotation axis 201 is in parallel with the crystal axial direction <110> of the silicon substrate 2, the measurement of the axial force of the rotation axis can be performed.

In the like manner, also in the bridge circuit 305, by forming the bridge circuit by a combination of the impurity diffusion resistors 305a and 305c arranged in the direction in parallel with the direction [100] and the impurity diffusion resistors 305b and 305d arranged in the direction in parallel with the [010] direction, the correction can be made for the temperature change. Further, in this case, since the bridge circuit has sensitivity for the shear strain in the XY directions only and no sensitivity for the normal strain, the highly precise measurement can be performed. Further, in this case, a high sensitivity for the strains of XY directions in parallel with and vertical to the <110> direction, that is, the [100] direction and the [010] direction is obtained. Hence, as shown in FIG. 2, by attaching the bridge circuit 305 so that the axial center of the rotation axis 201 is in parallel with the crystal axial direction <110> of the silicon substrate 2, the measurement of the torque can be performed.

Figure 5:
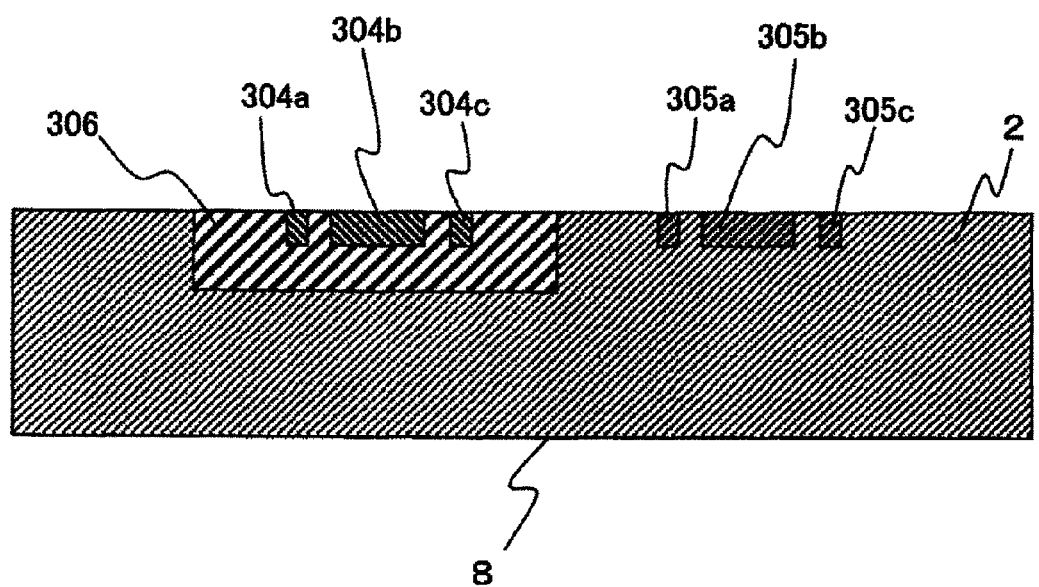
FIG. 5 is a schematic view showing a sectional structure of the mechanical-quantity measuring device according to the first embodiment of the present invention.

FIG. 5 shows a sectional structure of the mechanical-quantity measuring device 1. In the present embodiment, if the two sensors are simply arranged to measure the torque and the axial force with high precision, there arises a problem. That is, the silicon substrate 2 is a p-type, and it means that a p-type diffusion layer and a n-type diffusion layer are formed into one silicon substrate 2, as a result, a diode is formed and a current flows between the bridge circuit 304 and the bridge circuit 305.

Therefore, in the present embodiment, the problem is solved by forming a n-type well 306 which is the impurity diffusion layer not forming the bridge circuit in the vicinity of the bridge circuit 304, and forming the impurity diffusion resistors 304a, 304c, 304b, and 304d inside the n-type well 306. In this case, the n-type well 306 is connected to the plus side of the power source, and the p-type silicon substrate 2 is connected to a ground side of the power source. That is, inside the semiconductor chip, the plus side of the power source of the bridge circuit 304 and the well 306 are wire-bound, and the ground side of the bridge circuit 304 and the silicon substrate 2 are wire-bound. As a result, no current flows between the bridge circuits, and the highly precise measurement can be performed. Further, though the wire connection may be made outside of the semiconductor chip, which is the mechanical-quantity measuring device 1, it is much better if the wire connection is made inside the semiconductor chip, because the potential is all in conformity and more highly precise measurement can be performed, and the advantage that the connection work by the measuring person is reduced is also obtained. For the silicon substrate 2, an n-type may be used, and in this case, in the vicinity of the bridge circuit 305, a p-type well 306 is required to be formed.

Figure 6:
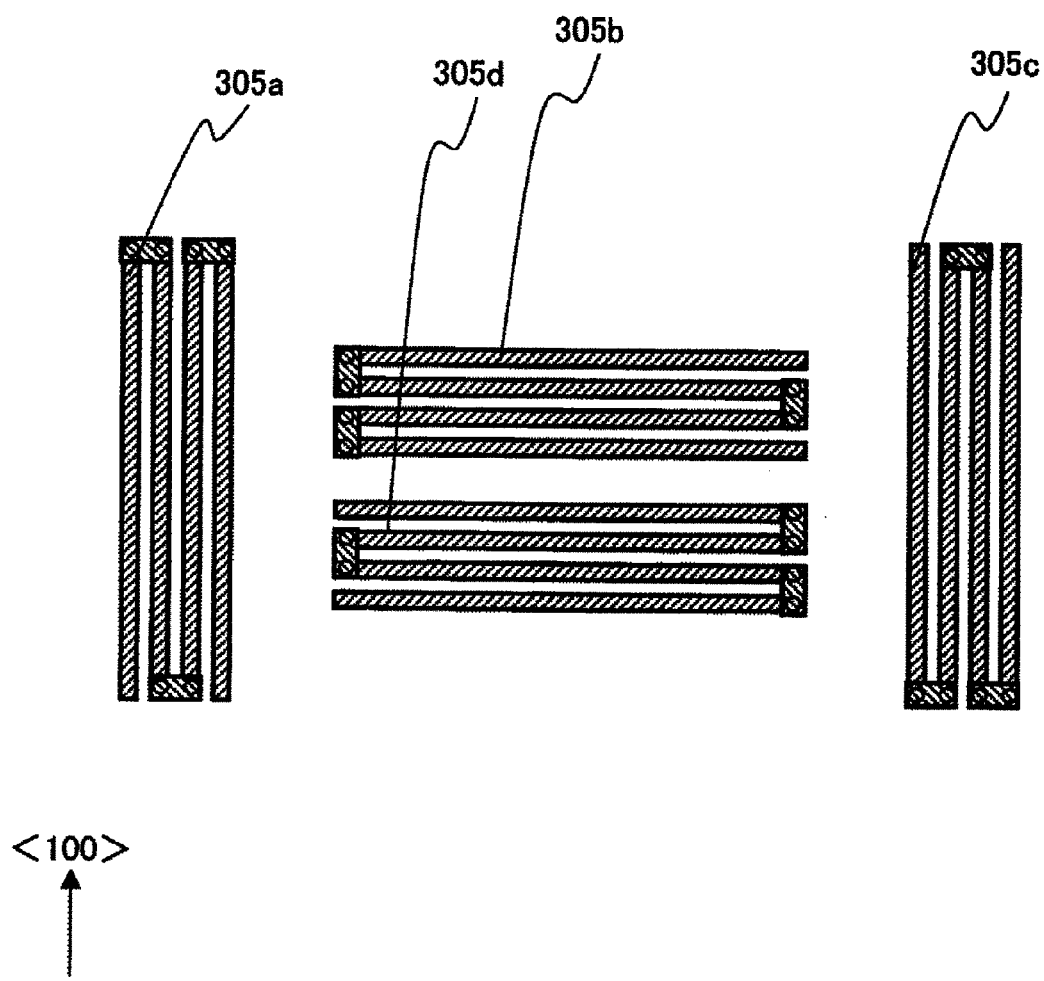
FIG. 6 is a schematic view showing the detail of the mechanical-quantity measuring device according to the first embodiment of the present invention.

Further, as shown in FIG. 6, in order to reduce power consumption, the length of the diffusion resistor may be lengthened to raise the resistance values of the impurity diffusion resistors 305a, 305b, 305c, and 305d. In this case, since the resistance value can be raised without increasing the area of the sensor so much, the advantage that the consumption power of the sensor can be reduced is obtained. The impurity diffusion resistors 305a, 305c, 305b, and 305d have their resistance values increased by being connected using contact halls and folded back. Note that, in the present invention, if the diffusion resistors are formed by being folded back in order to connect each other like this, and the wiring is not drawn outside of the bridge from the halfway mark, it is regarded as a one piece of long diffusion resistor.

As can be seen in the torque detection device of Japanese Patent Laid-Open Publication No. 6-229853, in measuring torque, it is a common practice that the strain sensor is obliquely adhered so that a 45 degree oblique direction against the axial center of the rotation axis is a strain measuring direction. However, according to this way of thinking, while measuring the axial force of the same direction as the axial center on the silicon substrate 2, if an attempt is made to measure a torque by obliquely arranging the bridge circuit 304, there arises a problem because the silicon substrate 2 is made of a monocrystal. That is, if trying to obliquely arrange the bridge circuit 304 as it is, a crystal axis of the direction of electric current changes, therefore its characteristics changes, and as a result, there arises a problem that a sensitivity for strain almost disappears. Hence, like the bridge circuit 305, by providing the impurity diffusion resistors 305a, 305c, and 305b, 305d in the oblique direction, the sensitivity for strain in the direction is made to be the maximum. That is, in the present invention, it became possible that the bridge circuit 304 has hardly any sensitivity for strain in the oblique direction, but has the maximum sensitivity for strain in the XY directions of FIG. 4, while the bridge circuit 305 does not have the sensitivity for strain in the XY directions of FIG. 4, but has the maximum sensitivity for strain in the oblique direction. Since in the present invention it is able to choose the types of the crystal surface, crystal axis and impurity diffusion layer so that the normal strain and shear strain can be obtained, the measurement of the torque and axial force is enabled by one chip. For example, when another crystal axis is used, there arises a problem that the bridge circuit has complicated multiaxial sensitivity for strain and the like, so that the measurement becomes difficult.

By forming two bridge circuits on one silicon substrate 2 in this manner, the normal strain and shear strain can be measured within the small chip, and therefore, the measuring positions are not separated, and even for the measurement of stress concentration field, the highly precise measurement can be performed. Further, since there are places to measure the normal strain and shear strain within the same chip, comparing to the case where two chips are separately adhered, the influence caused by variation in sensitivity by the adherence can be reduced. Further, since the bridge circuit 304 has the maximum sensitivity in the XY directions and the bridge circuit 305 has the maximum sensitivity in the oblique direction, the advantage that the difference in the measuring direction forms 45 degrees so that the highly precise measurement can be performed is obtained. Further, by forming two bridge circuits on one silicon substrate 2 in this manner, the advantage that the work of adhering is over for once.

However, though the bridge circuit 304 of the present embodiment has the maximum sensitivity in the XY directions, it has a structure of receiving the influences of strain both of the X direction and the Y direction equivalently. Hence, there is a problem that, though it is very effective for the measurement of a uniaxial strain field, it is difficult for the measurement of a complicated strain field. Therefore, in the following second embodiment, the mechanical-quantity measuring device 1 will be shown, which can measure even the complicated strain field.

Further, in the present embodiment, though an example has been shown by limiting it to the silicon substrate 2, even if it is another semiconductor substrate, it has the same effect. It has an advantage that an electronic circuit can be laid within the substrate by using the semiconductor manufacturing process in the case where a semiconductor substrate such as silicon is prepared for the substrate of the mechanical-quantity measuring device 1.

In this case, the output of the strain detection unit 3 is not required to be directly outputted outside of the mechanical-quantity measuring device, but various circuits such as an amplifier circuit, analogue-digital converter, rectifier-detection circuit, and antenna circuit are mounted within the semiconductor substrate, and after amplifying the output of the strain detection unit 3 or after converting it into digital, it can be outputted outside of the mechanical-quantity measuring device or outputted in a radio communication format.

In this case, since the output of the strain detection unit 3 can be amplified or converted into digital within the mechanical-quantity measuring device, the influence to the output data by the external noise can be minimized, even when data is outputted outside of the mechanical-quantity measuring device 1, so that the highly precise measurement of strain can be performed. Further, in the case where the output from the strain detection unit 3 is transmitted by air, since the mechanical-quantity measuring device 1 does not require a naked terminal used for wire connection outside, so corrosion and the like do not develop on pads and the like, as a result, a highly reliable mechanical-quantity measuring device can be provided.

[Second Embodiment]
<Biaxial Separation Chip>

Figure 7:
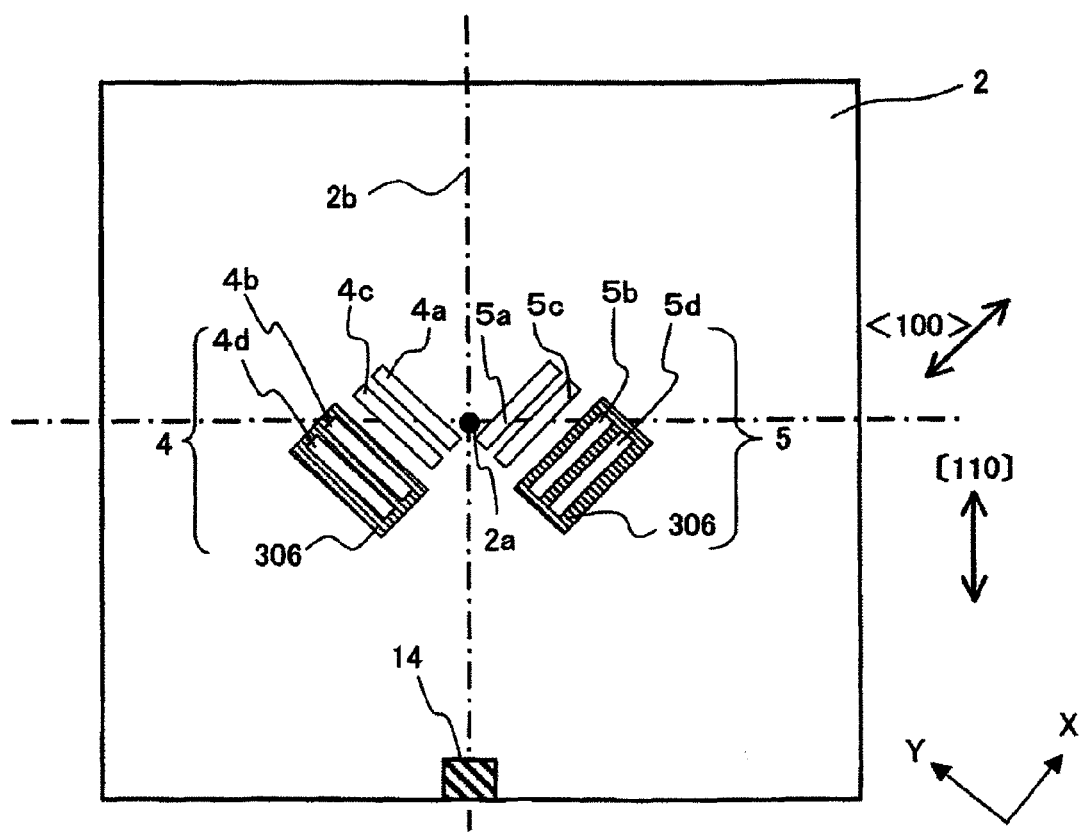
FIG. 7 is a schematic view showing the detail of a mechanical-quantity measuring device according to a second embodiment of the present invention.
Figure 8:
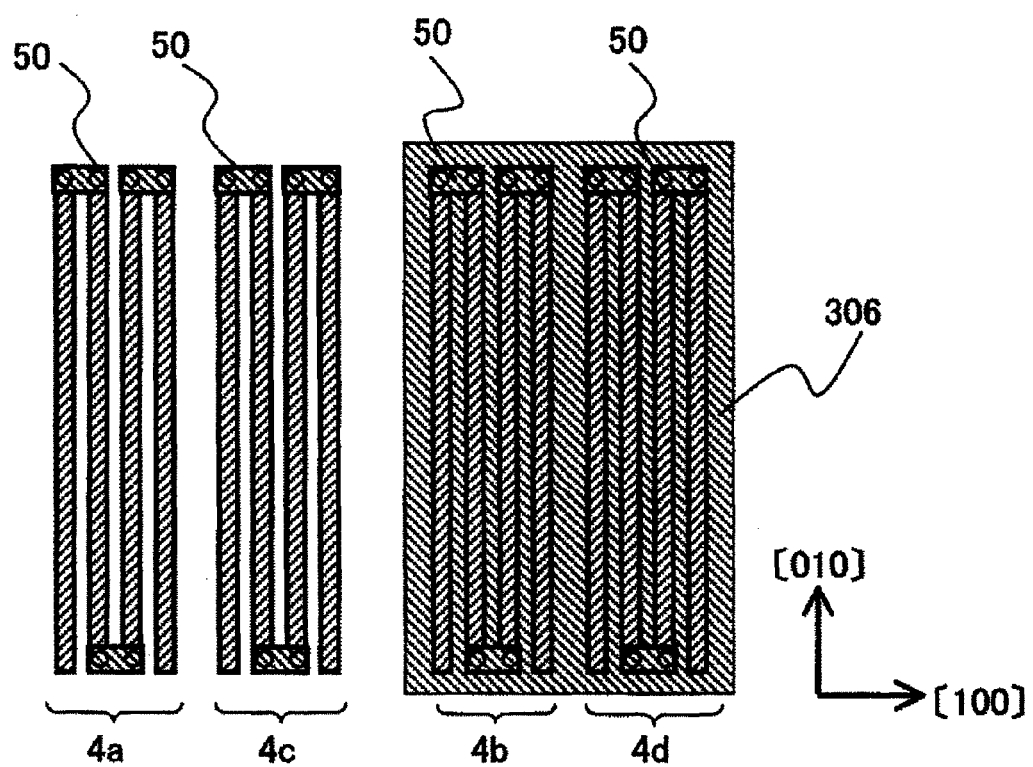
FIG. 8 is a schematic view showing the detail of a mechanical-quantity measuring device according to a second embodiment of the present invention.

A second embodiment in the present invention will be described using FIGS. 7 to 11. As shown in FIG. 7, in the present embodiment, to measure a biaxial strain field with high precision, a bridge circuit 4 and a bridge circuit 5 are provided. The bridge circuit 4 is composed of a combination of n-type diffusion resistors 4a and 4c provided such that a direction of the electric current is in parallel with the <100> direction of the silicon substrate 2, and p-type diffusion resistors 4b and 4d provided such that a direction of the electric current is in parallel with the <100> direction of the silicon substrate 2, and the diffusion resistors 4a, 4b, 4c, and 4d are connected in this order. Further, the bridge circuit 5, similarly to the bridge circuit 4, has both of an n-type diffusion layer and a p-type diffusion layer provided such that the direction of the electric current is in parallel with the <100> direction. However, the longitudinal direction of the n-type diffusion layer of the bridge circuit 5, that is, the direction of the electric current and the longitudinal direction of the n-type diffusion layer of the bridge circuit 4 are arranged so as to be orthogonal to each other. In other words, as shown in detail in FIG. 8, the bridge circuit 4 is composed of n-type diffusion resistors 4a and 4c arranged in the direction in parallel with a [010] direction and the p-type diffusion resistors 4b and 4d arranged in the direction in parallel with a [010] direction, and the diffusion resistors 5a, 5b, 5c, and 5d are connected in this order.

In the vicinity of the p-type diffusion resistors 4b and 4d, a well 306 diffusing an n-type impurity is formed. The well is preferably one piece for each bridge so as to include the p-type diffusion resistors 4b and 4d, and in that case, since ion implantation conditions in forming diffusion layer become simple, the resistance values of the diffusion resistors 4b and 4d can be matched with high precision, which is also preferable in view of space efficiency. This n-type well 306 is connected to the plus side of a power source, and a silicon substrate 2 is connected to the ground side of the power source. Note that, in the present embodiment, though the use of a p-type silicon substrate is presupposed, in the case where an n-type silicon substrate is used, a p-type well is required to be formed in the vicinity of the n-type diffusion resistors 4a and 4c. In like manner, the bridge circuit 5 is composed of n-type diffusion resistors 5a and 5c arranged in the direction in parallel with the [100] direction, and p-type diffusion resistors 5b and 5d arranged in the direction in parallel with the [100] direction. In the case of the present embodiment also, similarly to the first embodiment, even when deviated from the inscribed directions, if they settle down to range of ±10 degrees, approximately the same effect can be expected.

Figure 9:
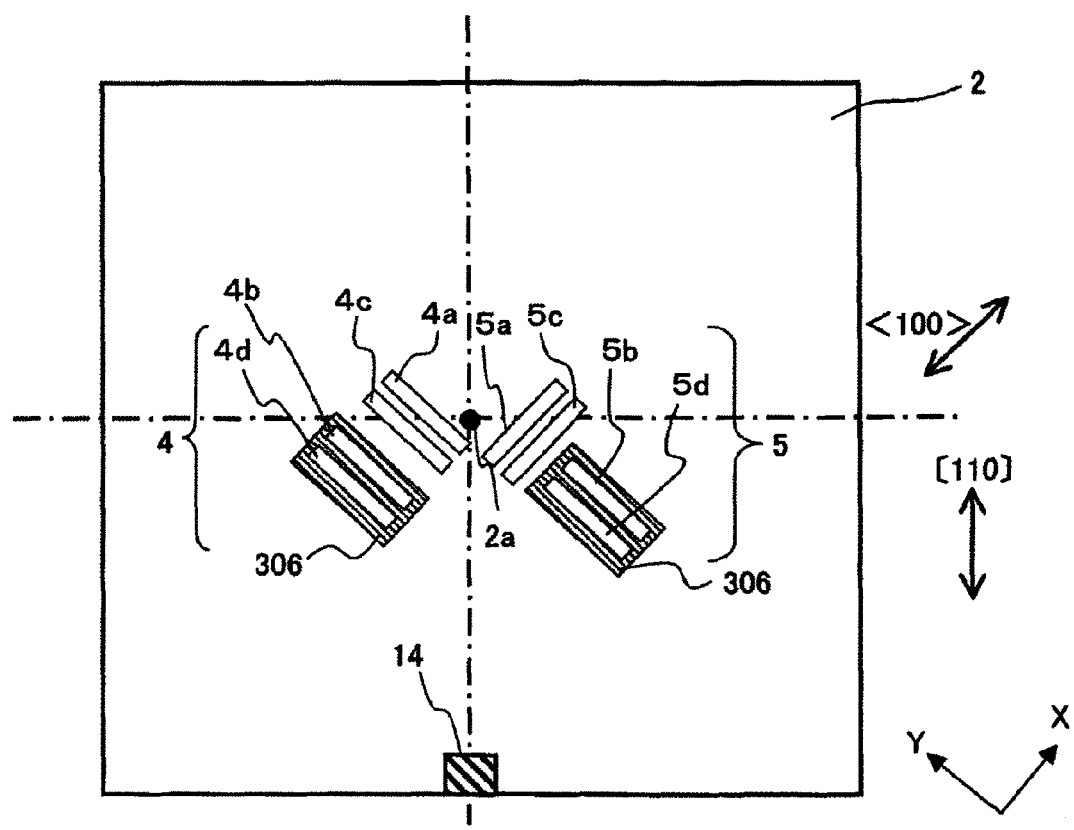
FIG. 9 is a schematic view showing the detail of the mechanical-quantity measuring device according to the second embodiment of the present invention.

FIG. 9 shows an example in which the arrangement of the p-type diffusion layers of the bridge circuit 5 is changed. In the present embodiment, though the longitudinal direction of the n-type diffusion resistor of the bridge circuit 4 is approximately orthogonal to that of the n-type diffusion resistor of the bridge circuit 5, the longitudinal direction of the p-type diffusion resistor of the bridge circuit 4 is approximately in parallel with that of the bridge circuit 5.

Figure 10:
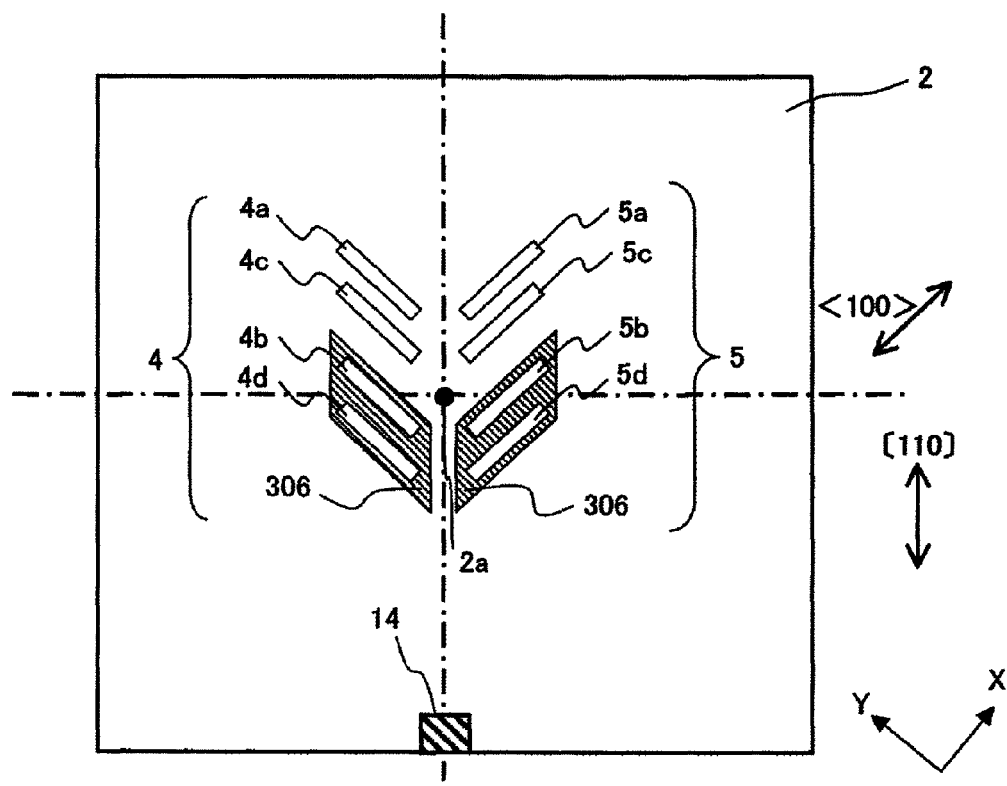
FIG. 10 is a schematic view showing the detail of the mechanical-quantity measuring device according to the second embodiment of the present invention.

Further, FIG. 10 shows an example in which the arrangement of the diffusion layers of the bridge circuit 4 and the bridge circuit 5 are changed. In the present embodiment, the diffusion resistors of the diffusion resistors 4a, 4b, 4c, and 4d directed to the <100> direction in the longitudinal are arranged in parallel with the <110> direction, and the advantage that such a arrangement does not take a space in the cross direction of the figure is obtained. Hence, the circuit such as an amplifier can be stored in an empty space in the cross direction of the figure. Further, the bridge circuit 4 and the bridge circuit 5 are preferably made quite symmetrical, and in that case, since the influences of the chip ends are equally received by the bridge circuit 4 and the bridge circuit 5, the advantage that the measurement can be performed with few errors is obtained.

Figure 11:
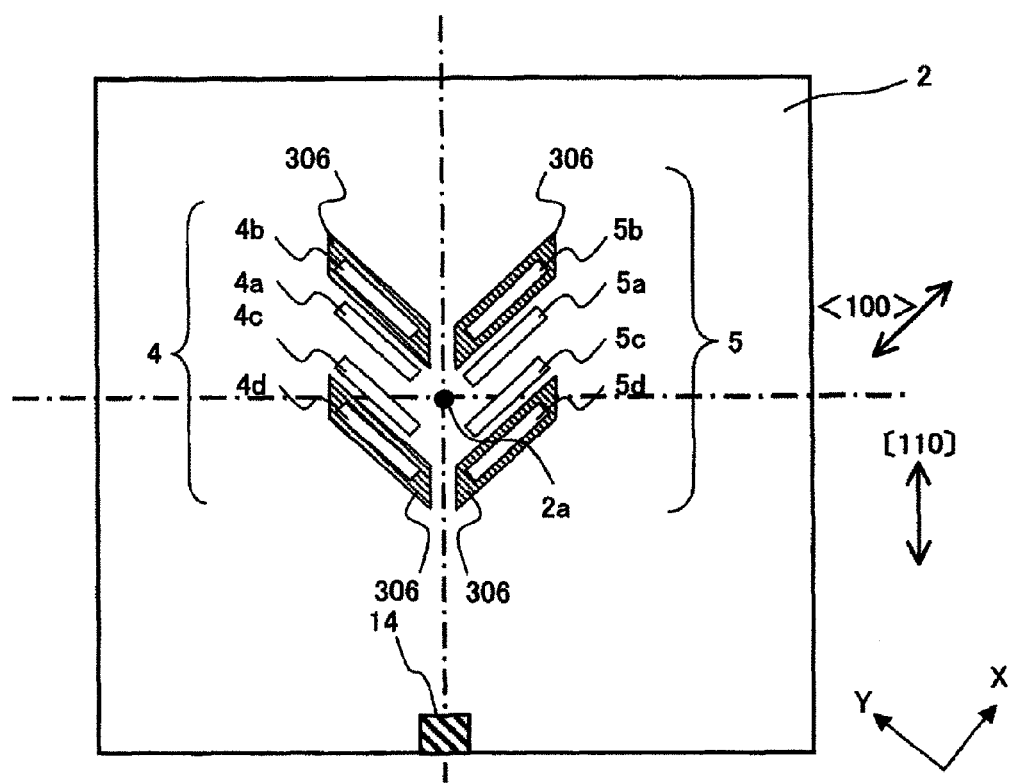
FIG. 11 is a schematic view showing the detail of the mechanical-quantity measuring device according to the second embodiment of the present invention.

Further, FIG. 11 shows the case where the diffusion resistors 4a and 4c composed of the n-type diffusion layers are sandwiched by the diffusion resistors 4b and 4d composed of the p-type diffusion layers. In this case, the diffusion resistors 4a and 4c with high sensitivity for strain can be arranged in the chip center portion, therefore, no influences by the strain release areas of the chip ends received, the advantage that the more highly precise measurement can be performed is obtained. Note that, in this case, two wells are required for each bridge.

Next, the action and effect by the present embodiment will be described.

In the case where strain measurement is performed by taking the impurity diffusion layer formed on the silicon substrate as a strain sensitive resister body and using a pieszoresistance effect of the impurity diffusion layer, variation in the resistance value of the impurity diffusion layer receives the influence of the strain in the direction different from a target strain measuring direction. Hence, in the case where the semiconductor mechanical-quantity measuring device is arranged in the measured object in which a multiaxial strain is developed, there has been a problem that the strain amount in a specific direction is unable to be detected precisely.

If the n-type diffusion resistor is arranged such that the <100> direction becomes the longitudinal direction, the sensitivity for the normal strain is large, and, the sensitivity for the strain in parallel with the longitudinal direction (that is, the current direction) and the sensitivity for the strain vertical to the current direction are vastly different. On the other hand, if the p-type diffusion resistor is arranged such that the <100> direction is the longitudinal direction, sensitivity for the normal stain is extremely small. By combining these diffusion resistors as the bridge circuit, even when a temperature change occurs, its influence can be suppressed, and the strain in a specific direction can be measured with high precision.

In this manner, the diffusion resistor composing at least one bridge circuit is combined with two types of diffusion resistors of the n-type diffusion resistor with longitudinal direction to be the <100> direction and the p-type diffusion resistor with longitudinal direction to be the <100> direction, so that the highly precise measurement can be performed even when there occurs the multiaxial strain. Note that, in the present embodiment, the biaxial strains in the <100> direction and in the <010> direction can be separated.

Here, as the impurity diffusion layer with high sensitivity for strain used for measurement, there are the n-type diffusion resistor in parallel with the <100> direction and the p-type diffusion resistor in parallel with the <110> direction, and as the impurity diffusion layer with low sensitivity for strain, there are the p-type diffusion resistor in parallel with the <100> direction and the n-type diffusion resistor in parallel with the <110> direction.

Further, as shown in the embodiment in FIG. 7, by making the configurations and patterns of the diffusion resistors in the bridge circuits 4 and 5 the same, variation due to the manufacture and characteristics of sensitivity for strain gauge of the bridge circuits 4 and 5 can be quite the same, and therefore, the effect that the error in separation calculating of each strain component from the outputs of both circuits is reduced, can be obtained. If the diffusion resistors 4a and 4c and the diffusion resistors 5a and 5c are approximately line-symmetrical with a line 2b as a center, they equally receive the influence of the mutual existence of the impurity diffusion layer, therefore, the highly precise measurement can be performed. Here, the "line-symmetrical" is not necessary to be exactly line-symmetrical, and when folded back by the symmetrical line, if there is a symmetric property not less than 50% of the area forming the impurity diffusion layer is superposed, it is enough. Further, if the diffusion resistors 4a, 4c, 5a, and 5c are arranged such that the line 2b according to the symmetry of the line symmetry passes through the centroid 2a of the flat surface of the silicon substrate 2, the influences of the ends of the silicon substrate 2 are equally received, as a result, the advantage that the measurement with few error can be performed is obtained. Further, if the diffusion resistors 4b, 4d, 5b, and 5d are arranged line-symmetrical, the effect thereof can be further increased.

And, even if each bridge is formed in a separate chip to make two chips, though measuring is theoretically possible, in reality, when two chips are adhered, relative error of the angel often occurs, and comparing to the case where three bridges are arranged and formed on one chip in a crystal axial direction, the measuring accuracy markedly deteriorates. Further, when two chips are adhered, there arises a problem that an error tends to occur due to slight difference in the thickness of a bonding agent for adhering. Hence, in the present embodiment, the crystal axial directions of the semiconductor substrate are suitably allowed to match, and the biaxial normal strain and shear strain can be measured by one chip, therefore, the highly precise measurement is realized.

Further, according to the present embodiment, the distance among the diffusion resistors with high sensitivity for strain 4a, 4c, 5a, 5c is made to be shorter than the distance among the diffusion resistors with low sensitivity for strain 4b, 4d, 5b, 5d, and further, the diffusion resistors with high sensitivity for strain 4a, 4c, 5a, 5c are made closer to the centroid 2a than the diffusion resistors with low sensitivity for strain 4b, 4d, 5b, 5d, so that these two bridges are formed at the micro region of several hundred microns, and therefore, the advantage that the strain state of the stress concentration field can be derived with high precision is obtained.

Further, by providing at least one direction indication mark 14 on the chip surface, the direction of the sensor can be easily recognized, and its handling becomes easy. For example, when the measuring person adheres the sensor chip on the measured object, by adhering the chip with recognition of its direction, the advantage that he can identify the main stress direction based on this direction is obtained.

[Third Embodiment]

<Adjusting Resistor of Biaxial Separation Chip>

Similarly to the case of the second embodiment, in the case where the n-type diffusion resistor and the p-type diffusion resistor coexist in one bridge circuit, at least two ion implantation processes, one for forming the n-type diffusion resistor and the other for forming the p-type diffusion resistor are required. In these two ion implantation processes, if variation of the diffusion resistance value occurs, an offset is generated in each bridge circuit.

Figure 12:
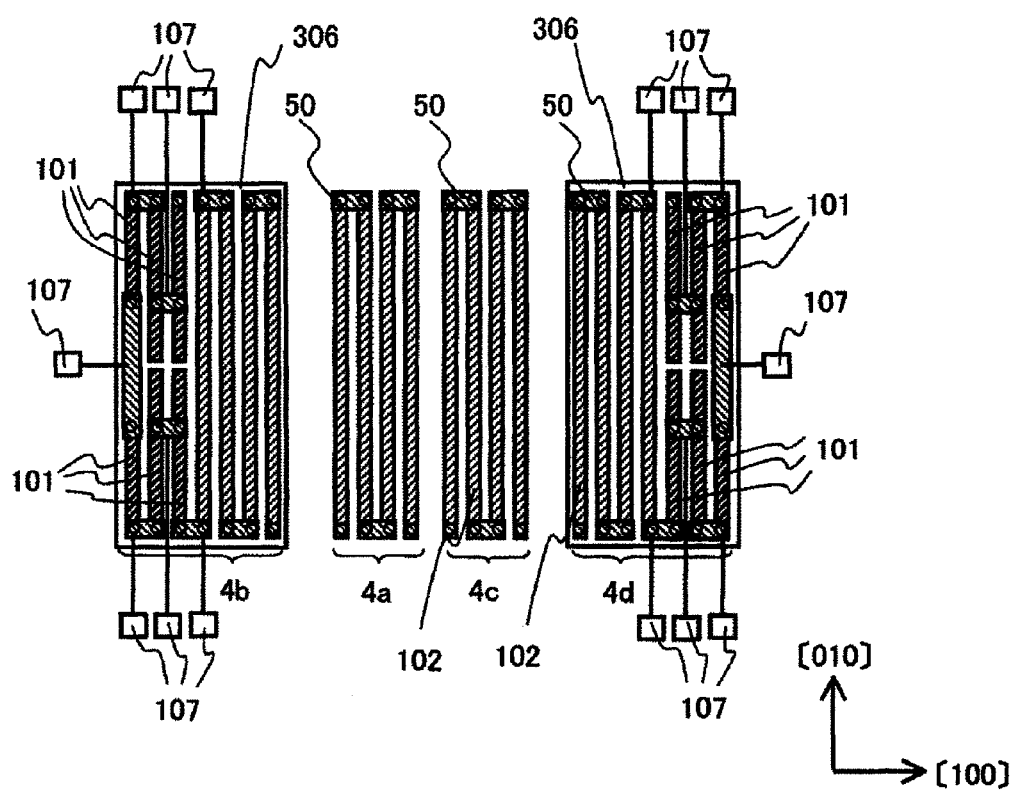
FIG. 12 is a schematic view showing the detail of a mechanical-quantity measuring device according to a third embodiment of the present invention.

FIG. 12 is an embodiment of the present invention which solved this problem. In the present embodiment, p-type diffusion resistors 4b and 4d are provided with a diffusion resistor for resistance adjustment 101 is provided, respectively. Note that, the diffusion resistor for resistance adjustment 101 is composed of the p-type diffusion resistor. The diffusion resistors for resistance adjustment 101 are connected in series, and wirings are drawn out between the diffusion resistors for resistance adjustment, and for example, they are connected to pads 107, respectively.

Figure 13:
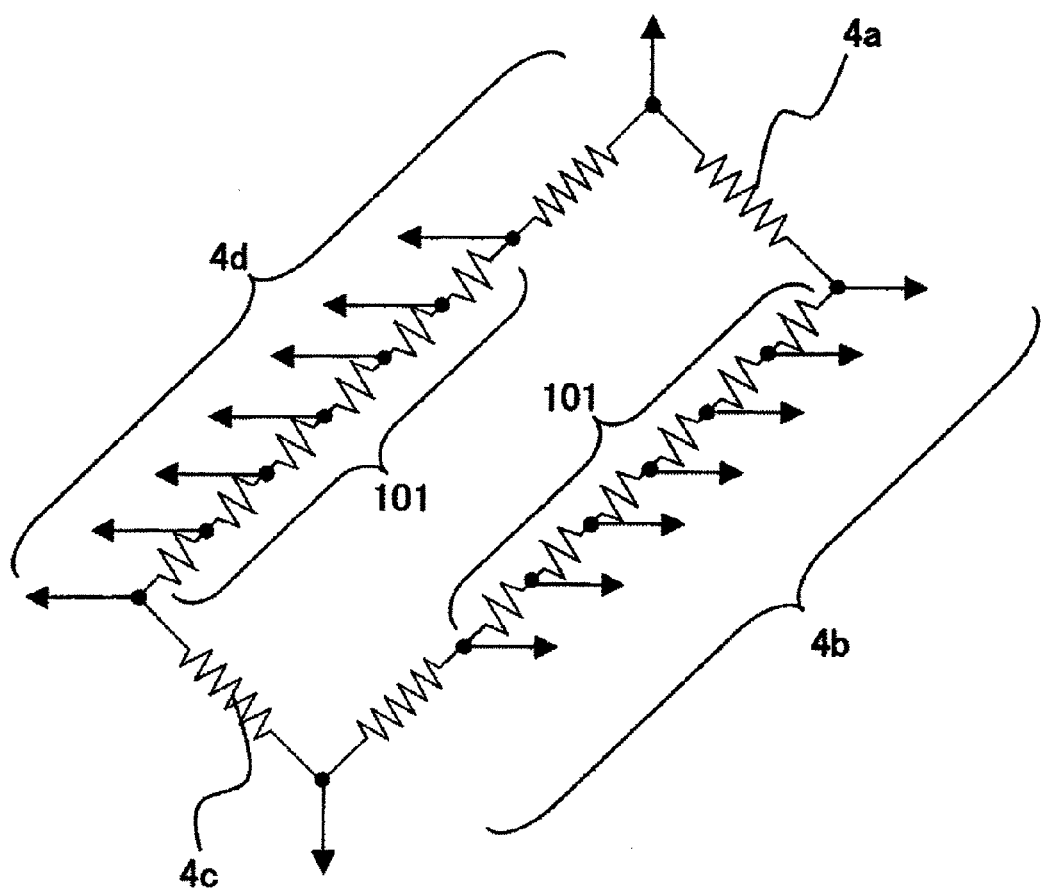
FIG. 13 is a view showing a connecting state of the diffusion resistors composing a bridge circuit of the mechanical-quantity measuring device according to the third embodiment of the present invention.

To bring the offset value of the bridge circuit to the vicinity of zero, the values of the n-type diffusion resistors 4a and 4c and the p-type diffusion resistors 4b and 4d are required be bought to the same level. However, to control the vales of the n-type diffusion resistors and the p-type diffusion resistors, a control alone of the concentration of the impurity introduced to a monocrsaytalline substrate and the temperature and time of the subsequent impurity diffusion thermal processing is often not sufficient. Consequently, by providing the diffusion resistor for resistance adjustment 101 for finely adjusting the resistance value, the substantial resistance value of the p-type diffusion resistor can be changed, and the offset value can be adjusted to the vicinity of zero. Even if variation in sheet resistance due to the ion implantation processing occurs, from among the pads drawn out from the adjusting resistors as shown in FIG. 13, there exists somewhere a combination of pads in which this offset becomes small. Hence, if a combination of pads in which this offset becomes small is found, it is used as a bridge. At this time, the length of the diffusion resistor for resistance adjustment is made shorter than the length of the p-type diffusion resistor body composing the bridge circuit, so that the fine adjustment of the resistor can be made and the offset can be made much smaller. The adjusting resistor is provided in two diffusion resistors located at a opposite side among the diffusion resistors composing a wheatstone bridge. And by providing the positions for the respective main body resistors on the wheatstone bridge so as to come to the opposite angle side, it can be used for fine adjustment of the resistance value of four pieces of diffusion resistors.

Figure 14:
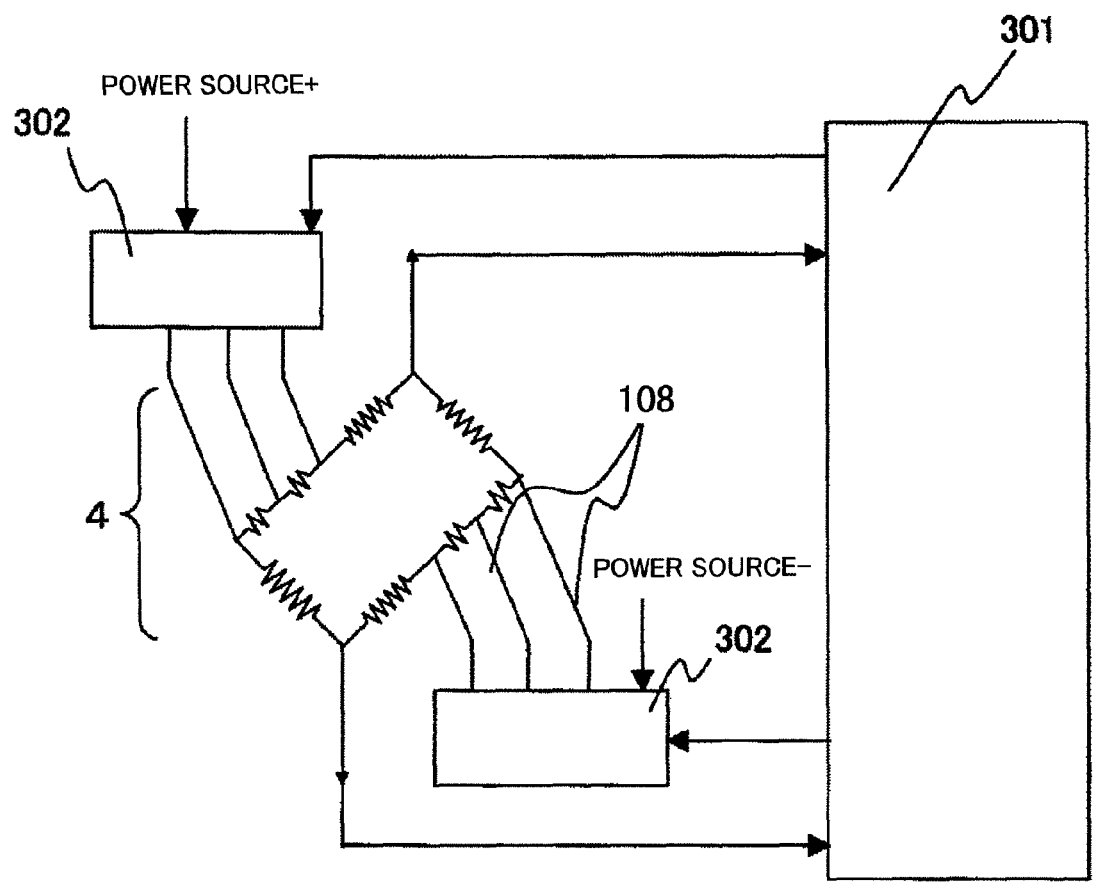
FIG. 14 is a block diagram showing an example of structure of the mechanical-quantity measuring device according to the third embodiment of the present invention.

In this manner, by drawing out the number of wirings larger than four from one bridge circuit, and selecting and using the pad well-balanced in voltage among them, an offset occurrence due to variation in sheet resistance derived from the ion implantation can be approximately substantially eliminated. And, among the wirings drawn out from this bridge circuit, which one should be selected can be automatically decided by using an amplifier and an A/D converter built-in CPU. Its circuit block diagram is shown in FIG. 14. By the signal from a CPU 301, a switch 302 is switched, and a decision that which wire among the lead wires drawn out from the bridge circuit should be selected to make offset small is made, and energization is performed to the diffusion resistor. Then, the output from the bridge circuit which reflects the error of the resistance value of the fabricated diffusion resistor is input to the CPU 301 as a voltage value through the A/D converter, thereby, the magnitude of the offset is determined. Then, one of lead wires 108, which minimize the offset, connected and used for strain measurement, is automatically selected by CPU 301. Note that, the lead wires not used may be left behind as they are or may be eliminated. Further, the measurement of the resistance value of the diffusion resistor and the decision of the lead wires to be used may be performed in the manufacturing step of the mechanical-quantity measuring device or may be performed before staring the measurement after having adhered the mechanical-quantity measuring device to the measured object for which the strain measurement is actually performed.

Incidentally, though the same effect is obtained by providing the diffusion resistor for resistance adjustment 101 at least in either of the n-type diffusion resistor or the p-type diffusion resistor, the p-type diffusion resistor is preferably provided with the diffusion resistor for resistance adjustment 101 composed of the p-type diffusion resistor in parallel with the <100> direction. By using the p-type diffusion resistor in parallel with the <100> direction with low sensitivity for strain as the diffusion resistor for resistance adjustment, the diffusion resistor for resistance adjustment does not have any sensitivity for the strain, and therefore, even when the resistance adjustment is made, the advantage that the strain can be detected with high precision is obtained. Further, as shown in FIG. 13, though the diffusion resistor for resistance adjustment 101 are provided in the diffusion resistors 4b and 4d, its position is desirably not at the side close to the diffusion resistors 4a and 4c, but is arranged outside of the sensor. As a result, the advantage that the drawing out of the wires toward the pad 107 becomes easy is obtained.

Note that, for the embodiments from FIGS. 7 to 11, the diffusion resistor for resistance adjustment 101 can be applied, and the same effect can be expected.

FIG. 12 is an enlarged view of impurity diffusion resistors 4a, 4b, 4c, and 4d of the present embodiment for explanation. The diffusion resistors 4b and 4d having the diffusion resistor for resistance adjustment 101 are p-type diffusion resistors in parallel with the <100> direction with low sensitivity for strain, and the diffusion resistors 4a and 4c not having the diffusion resistor for resistance adjustment 101 are n-type diffusion resistors in parallel with the <100> direction with high sensitivity for strain. The diffusion resistor for resistance adjustment 101 is shorter than a folded back resistor 102 forming the diffusion resistor main body, that is, the resistance value is formed low. There is plurality of diffusion resistors for resistance adjustment 101 in small size, which are drawn out by a wiring 50 and connected to the pad 107, so that the fine adjustment of the resistance value can be performed. Further, the diffusion resistors 4b and 4d have the diffusion resistor for resistance adjustment 101, that is, the diffusion resistor for resistance adjustment 101 exists in the diffusion resistors 4b and 4d located at the opposite side of the wheatstone bridge, therefore, the adjustment of the resistance values of four diffusion resistors 4a, 4b, 4c and 4d can be coped with. Further, as shown in FIG. 12, the diffusion resistor for resistance adjustment 101 are arranged at both end portions of the arrangement of the diffusion resistors 4a, 4b, 4c, and 4d, that is, by arranging the diffusion resistor for resistance adjustment 101 at the outmost, the pulling around them to the pads existing in plurality becomes easy. Note that, by keeping the resistance values of the diffusion resistors 4b and 4d including the diffusion resistor for resistance adjustment 101a little larger than the values of the diffusion resistors 4a and 4c, adjustment of increase and decrease of the resistance values can be easily performed, and an equilibrium state of bridge resistors can be easily realized.

[Fourth Embodiment]
<Biaxial Separation Chip of Polysilicon>

Figure 15:
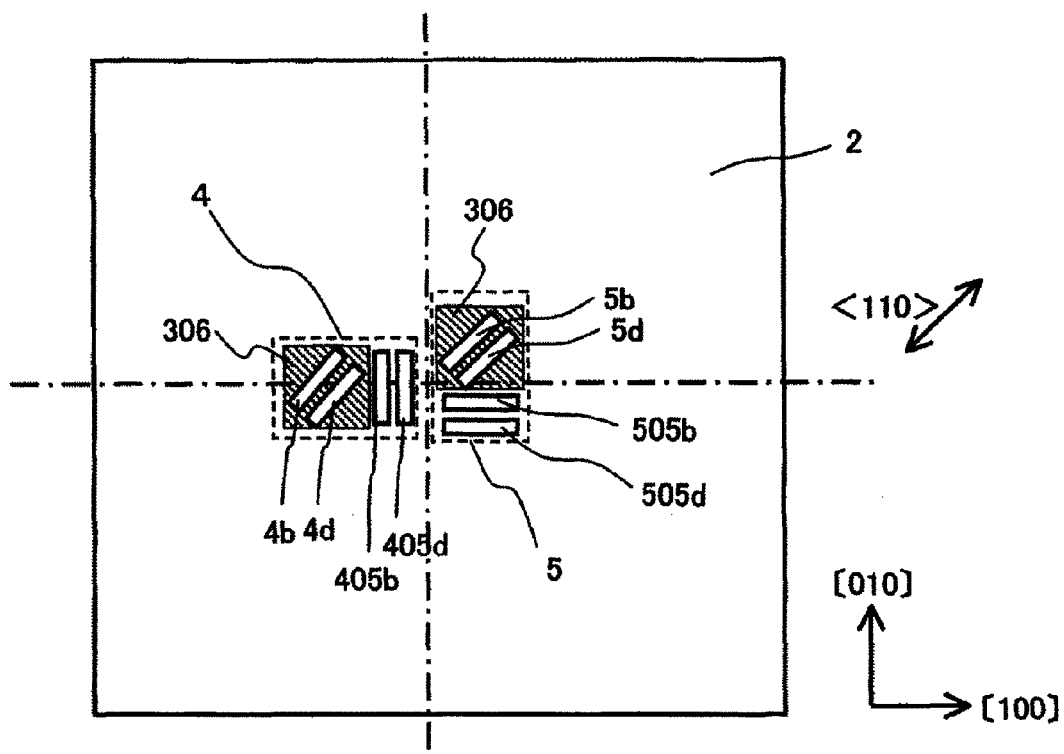
FIG. 15 is a schematic view showing the detail of a mechanical-quantity measuring device according to a fourth embodiment of the present invention.
Figure 16:
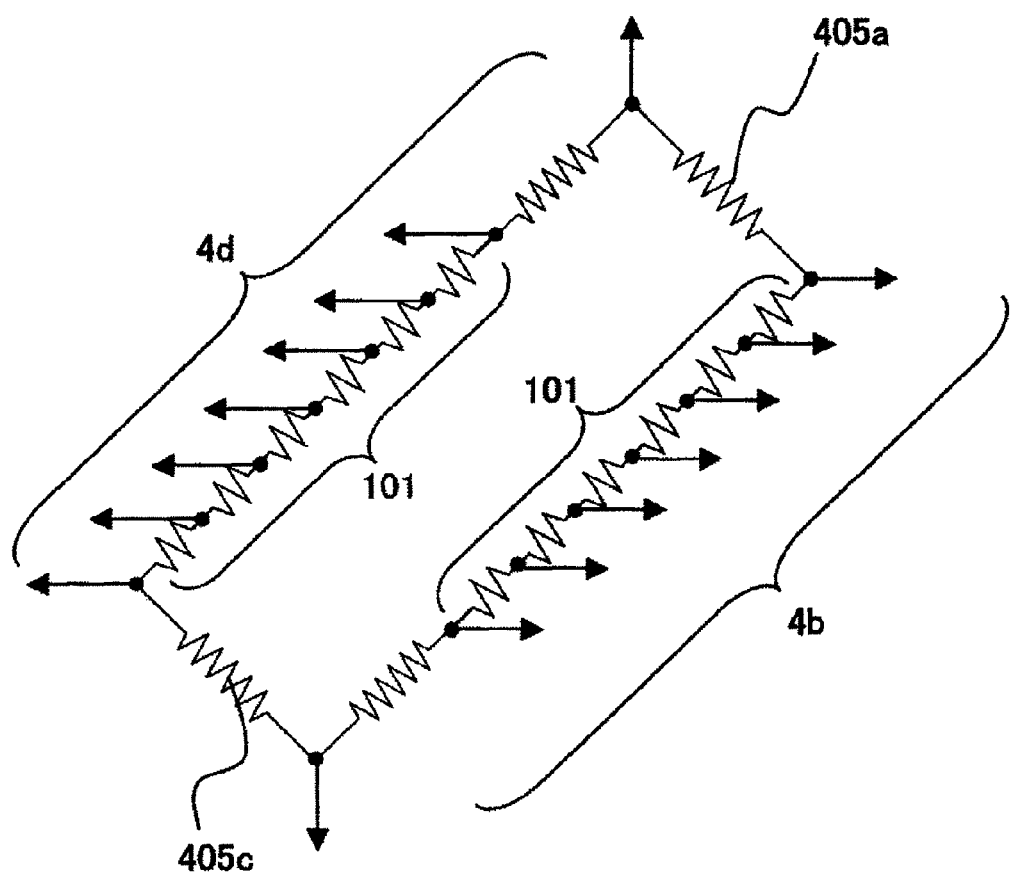
FIG. 16 is a block diagram showing an example of the structure of the mechanical-quantity measuring device according to the fourth embodiment of the present invention.

A fourth embodiment in the present invention will be described by using FIGS. 15 and 16. As shown in FIG. 15, in the present embodiment, to measure a biaxial strain field with high precision, a bridge circuit 4 and a bridge circuit 5 are provided, and each bridge circuit composed of a polysilicon wiring resistor and a diffusion layer resistor, respectively. The bridge circuit 4 is characterized by that which is composed of a combination of p-type diffusion resistors 4b and 4d provided such that the direction of electric current is in parallel with the <100> direction of the silicon substrate 2 and polysilicon wiring resistors 405b and 405d provided such that the direction of electric current is in parallel with the <110> direction of the silicon substrate 2. Further, the bridge circuit 5 is similarly composed of a combination of p-type diffusion resistors 5b and 5d provided such that the direction of electric current is in parallel with the <100> direction of the silicon substrate 2 and polysilicon wiring resistors 505b and 505d provided such that the direction of electric current is in parallel with the <110> of the silicon substrate 2. And, they are arranged such that, the longitudinal directions of the polysilicon wiring resistors 505b and 505d of the bridge circuit 5, that is, the direction of electric current and longitudinal directions of the polysiclion wiring resistors 405b and 405d of the bridge circuit 4 are orthogonal to each other. In the case of the present embodiment also, similarly to the first embodiment, even when deviated from the inscribed direction, if the direction settles down to the range of ±10 degrees, approximately the same effect can be expected.

In the case of the present embodiment also, similarly to the second embodiment, the strain field in a specific direction can be measured. In the polysilicon wiring resistor, sensitivity for normal strain of the longitudinal direction is large, and sensitivity for other directions is very small. On the other hand, since the p-type diffusion resistor is arranged such that the <100> direction is made into the longitudinal direction, the sensitivity for each strain component is extremely small. Hence, by connecting these components as the bridge circuit, a strain only in one direction can be measured with high precision. Then, the two bridge circuits are provided in one chip and the longitudinal directions of the polysilicon wiring resistors thereof are made orthogonal to each other, so that the measurement of the in-plane biaxial strain state can be performed.

Further, in the present embodiment, while the longitudinal direction of each polysilicon wiring resistor of the bridge circuit 4 and the bridge circuit 5 is made into the <110>, if the longitudinal direction of the polysilicon wiring resistor of the bridge circuit 4 and the longitudinal direction of the polysilicon wiring resistor of the bridge circuit 5 are arranged in an orthogonal state, the same effect can be expected in principle. Note that, in view of the packaging, easiness at subsequent attachment of the chip, and easiness of cognition, the longitudinal direction of the polysilicon wiring resistor is preferably arranged approximately vertical and in parallel with the <110> direction, similarly to the present embodiment.

Further, in the present embodiment also, due to ion implantation conditions and variation in the width of the polysilicon wiring resistor, variation in the value of each resistor composing the bridge occurs, and as a result, an offset tends to be generated. Hence, similarly to the third embodiment, as shown in FIG. 16, the diffusion resistor for resistance adjustment 101 is preferably provided. At this time, the diffusion resistor for resistance adjustment is preferably provided in the p-type diffusion layer from view point of accuracy.

[Fifth Embodiment]
<Triaxial Separation Chip>

Figure 17:
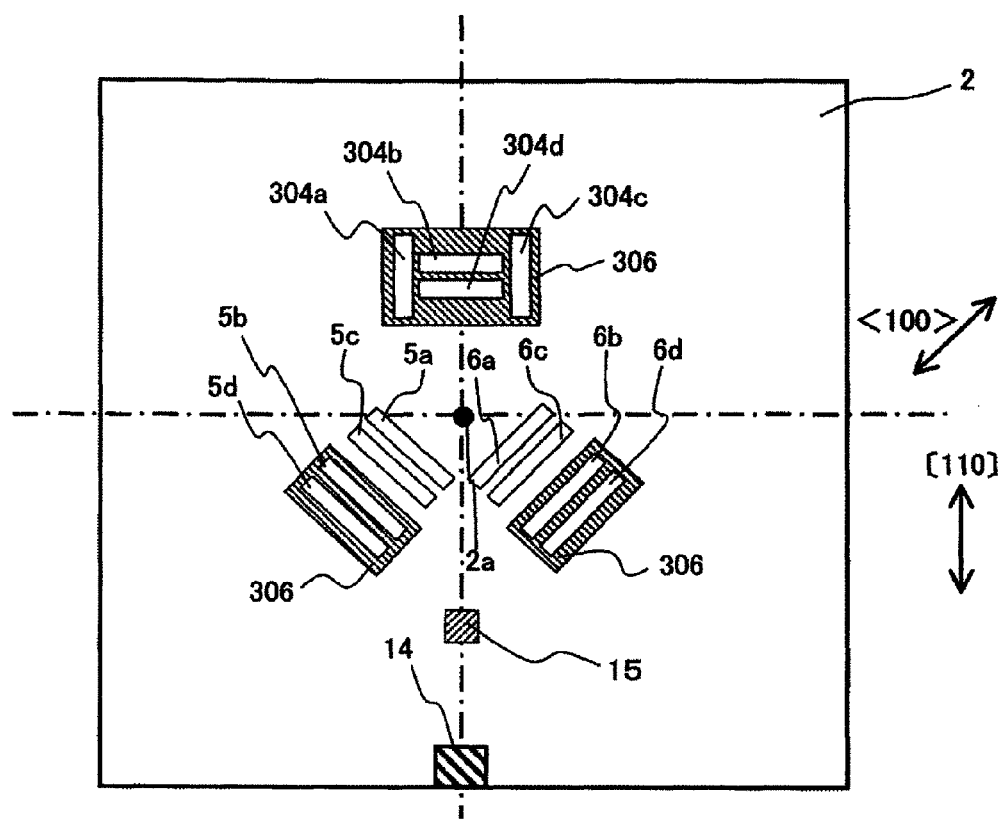
FIG. 17 is a schematic view showing the detail of a mechanical-quantity measuring device according to a fifth embodiment of the present invention.
Figure 18:
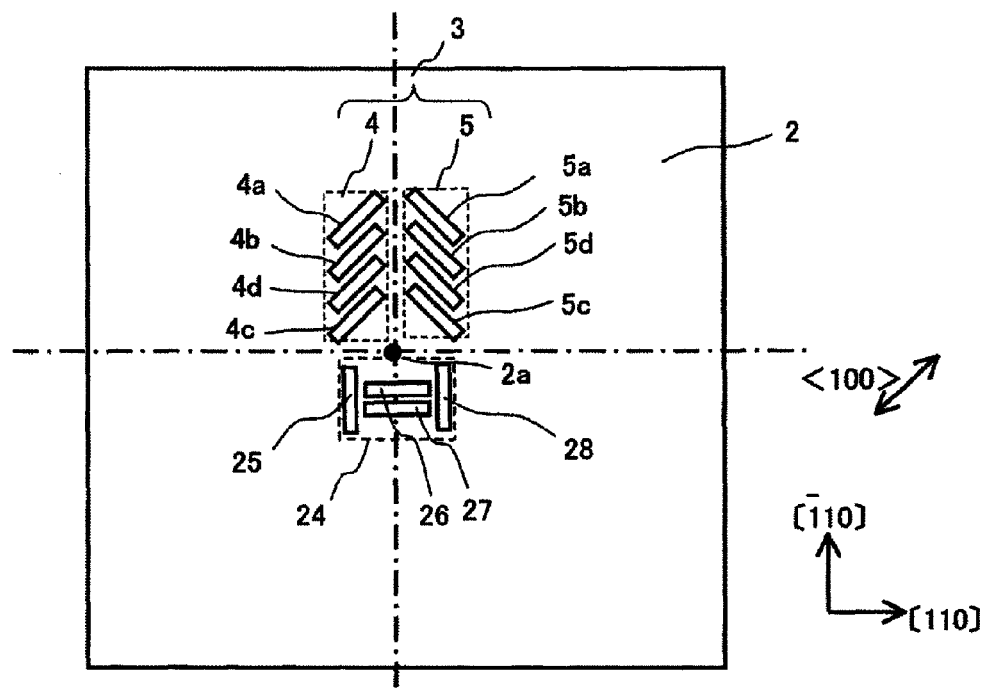
FIG. 18 is a schematic view showing the detail of the mechanical-quantity measuring device according to the fifth embodiment of the present invention.
Figure 19:
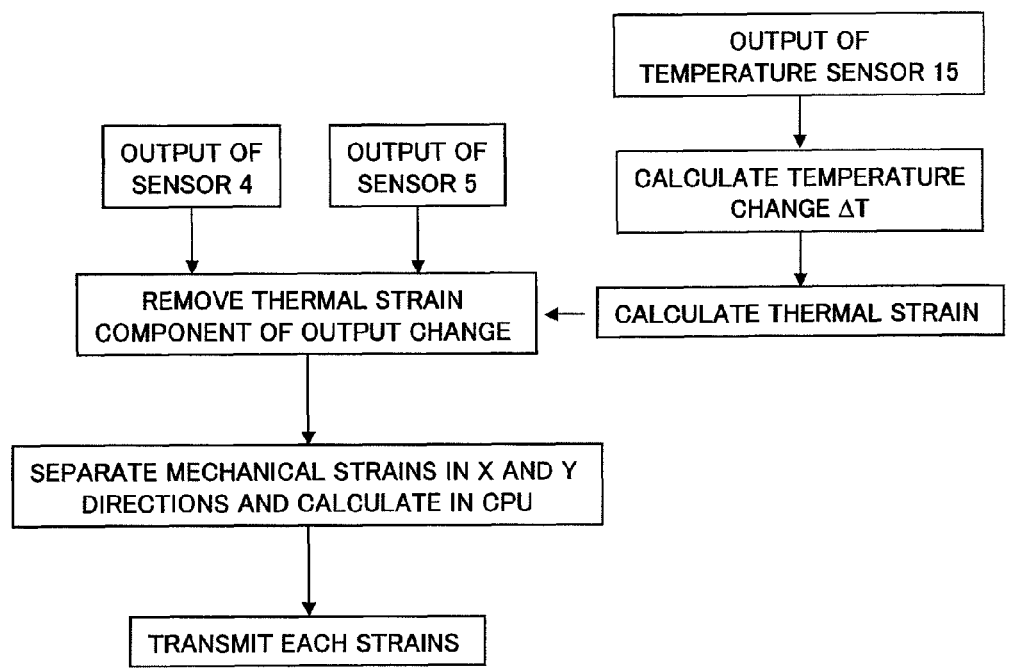
FIG. 19 is a view showing an operation flow of the mechanical-quantity measuring device according to the fifth embodiment of the present invention.

As shown in FIG. 17, by using a third bridge circuit 24, not only the normal strain component, but the shear strain component can be also separated. That is, the third bridge circuit 24 is similar to the bridge circuit 304 of the first embodiment. And, using the n-type diffusion layer, the third bridge circuit 24 may be made similar to the bridge circuit 305 of the first embodiment. In the present embodiment, if a strain measuring coordinate system is defined as shown in the FIG. 17, the normal strains in the directions of the [100] and the [010] and the shear strain inside the chip adhering surface can be measured. That is, two directions of the in-plane normal strain and one direction of the shear strain can be measured by this one chip. Namely, a specific direction of the measured member is aligned and adhered to the direction indication mark 14, so that two normal strain components in parallel with and vertical to the <100> direction of the semiconductor chip and one shear strain component can be measured, and using these three components, a strain state such as the main strain direction of the measured member can be determined. Further, the arrangement such as shown in FIG. 18 may be used. In FIG. 17, while the diffusion resistors 5a to 5d whose directions are directed to the <100> direction are lined up and arranged in the <100> direction orthogonal to the longitudinal direction, in FIG. 18, the diffusion resistors 5a to 5d are lined up and arranged in the <110> direction. Further, the third bridge circuit 24 measuring the shear strain is provided adjacent to the first bridge circuit 4 and the second bridge circuit 5 in the area in the direction (lower side in the Figure) in which the diffusion resistors of the first bridge circuit 4 and the second bridge circuit 5 are lined up. The "adjacent to" means that a distance between the sensors or the diffusion resistors is shorter than the length in the longitudinal direction of the diffusion resistor. In the case of FIG. 18, the diffusion resistors 4a to 4d and 5a to 5d or the like are intimately arranged, thereby an area occupancy ratio of the sensor for the silicon substrate surface can be lower, and this leads to miniaturization of the chip and reduction in the cost of the fabrication. Incidentally, in FIGS. 17 and 18, the third bridge circuit 24 was provided in the area in the direction (lower side in the Figure) in which the diffusion resistors of the first bridge circuit 4 and the second bridge circuit 5 are lined up, but the bridge circuit 24 may be arranged in the horizontal direction of the Figure.

According to the present embodiment, since three bridge circuits are arranged on the same semiconductor chip, the influences of the reduction in sensitivity caused by the thickness of the bonding agent used at the adhering are received by the three bridges quite identically, therefore, an error generated in separating and detecting each strain component can be reduced, as a result, the highly precise measurement can be performed.

And, according to the present embodiment, since three bridge circuits are arranged on the same semiconductor chip, the strain measurement of micro regions such as the measurement of stress concentration field can be performed.

Further, according to the present embodiment, since three bridge circuits are arranged on the same semiconductor chip, thermal conductivity of silicon is high so that the temperatures of the three bridge circuits become the same. As a result, the fluctuation of the characteristics caused by temperatures change affects the three bridge circuits in like manner, so that the highly precise measurement can be performed.

Further, according to the present embodiment, while a measurement of the shear strain enabled based on the second embodiment, the measurement of the shear strain can be also enabled by adding the third bridge circuit 24 based on the fourth embodiment.

<Chip with Temperature Sensor>

A temperature sensor 15 is further provided in the same chip of the mechanical-quantity measuring device. In other respects, the chip has the same structure, and can obtain the same effect as the first embodiment. Note that, the temperature sensor 15 is preferably a diode comprising a PN junction. As a result, the temperature sensor is not affected by the strain change, and can precisely measure the temperature change in the vicinity of the strain detection unit 3.

Particularly, in the case where the bridge is formed by a combination of the P-type diffusion layer and the n-type diffusion layer or a combination of the p-type diffusion layer and the polysilicon wiring resistor, as shown in the first, second, and third embodiments, since the temperature dependency of each resistor value is different, the offset tends to be large due to the temperature change. Hence, the temperature sensor is provided in the same chip so as to perform the correction of the measurement value.

An effect obtained by providing the strain detection unit 3 and the temperature sensor 15 on the same chip will be described using the flowchart of FIG. 20. A temperature change ΔT occurred in strain measuring strain is measured by the temperature sensor 15, and a thermal strain caused by the temperature change is calculated. As a result, in separating and calculating each strain component from the outputs of the bridge circuits 4 and 5, a thermal strain component can be removed.

[Sixth Embodiment]

<Chip with Strip Sensor>

Next, a sixth embodiment of the present invention will be described using FIG. 20. FIG. 20 shows main parts of a mechanical-quantity measuring device according to the sixth embodiment, and the same reference symbols are attached to the parts common with the second embodiment.

Figure 20:
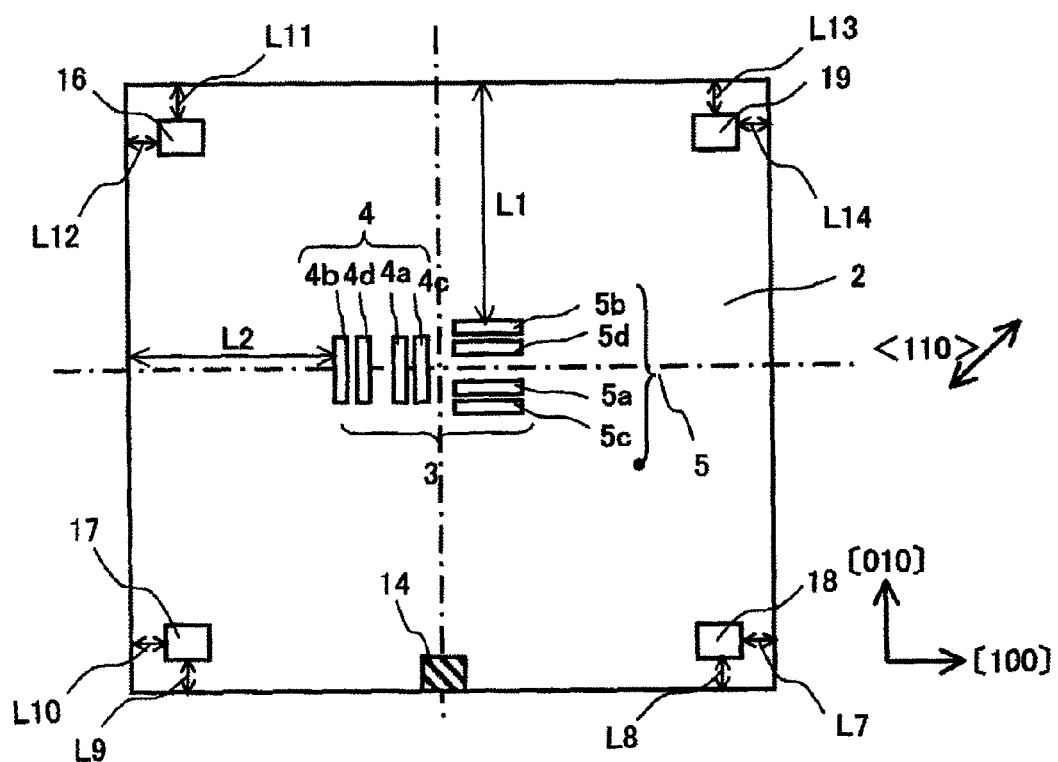
FIG. 20 is a schematic view showing the detail of a mechanical-quantity measuring device according to a sixth embodiment of the present invention.

In the mechanical-quantity measuring device of the present embodiment shown in FIG. 20, strip monitor sensors 16, 17, 18 and 19 are provided on the chip of the mechanical-quantity measuring device. In other respects, they are of the same concept with the second embodiment, and the same effect with the second embodiment is obtained. The strip monitor sensor, for example, can be formed of impurity diffusion resistors. Further, in the case where the strip monitor sensor is formed of impurity diffusion resistors, a wheatstone bridge is formed by the diffusion resistors of four corners, and by monitoring output variation, whether the mechanical measuring device 1 is stripped off from a measured object can be recognized. The area connecting the strip monitor sensor 16, 17, 18, and 19 is preferably arranged at the four corners so that so as to surround the position of the bridge circuits 4 and 5. Further, the distances L3 to L10, between the strip monitor sensors and the chip ends are preferably the same.

The mechanical-quantity measuring device of the present invention provides a strain detection unit on a semiconductor substrate in order to reduce power consumption, and can detect a strain remotely by attaching the device to a measured object. Since the measurement is performed remotely, even if a part of the mechanical-quantity measuring device is about to strip off, the user performing the remote monitoring cannot recognize and an erroneous measurement data is sent from the mechanical-quantity measuring device. Hence, in the present embodiment, by providing a strip sensor, the user is informed that the stripping is occurring, and is urged to re-set the measuring device, thereby the precise measurement is obtained.

In the case where the mechanical-quantity measuring device 1 is adhered to a measured object so as to perform the measurement, though the trackability of the strain for the measured object deteriorate in the vicinity of the periphery portion of the silicon substrate 2, by making the distances from the strip monitor sensors to the chip ends the same, the influences of the chip ends received by the strip monitor sensors can be the same. Since the strip monitor sensors 16, 17, 18, and 19 are arranged in the vicinity of the chip ends, the strip tends to occur, therefore, the monitor sensors are arranged at the positions where the strip detected as quickly as possible. Further, by forming the wheatstone bridge circuit by these strip monitor sensors 16, 17, 18, and 19, when the strip does not occur, an output becomes closer to zero, and when the strip occurs somewhere, the resistance of the strip monitor sensor of that portion varies, and the output of the bridge circuit increases. By forming the wheatstone bridge circuit in this manner, an effect that the output terminals are reduced is also obtained. Further, by forming the strip monitor sensor by impurity diffusion resistor, the manufacturing process other than the manufacturing process of fabricating the sensor is not required, and the sensor can be easily manufactured, and an effect that no increase in cost is required is also obtained. Note that, in the present embodiment, while the bridge circuits 4 and 5 are provided, but it may be enough by one.

[Seventh Embodiment]
<Chip with Amplifier>

Figure 21:
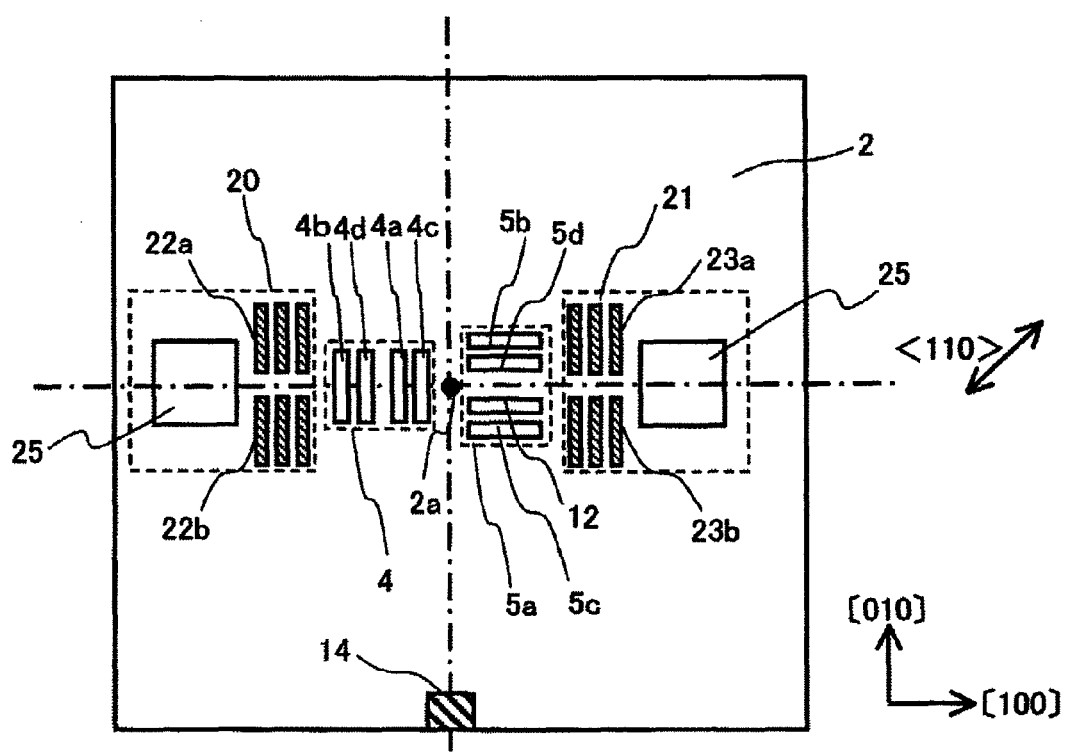
FIG. 21 is a schematic view showing the detail of a mechanical-quantity measuring device according to a seventh embodiment of the present invention.

Next, a seventh embodiment in the present invention will be described using FIG. 21. FIG. 21 shows main parts of a mechanical-quantity measuring device according to the seventh embodiment, and the same reference symbols are attached to the parts common with the second embodiment.

In the mechanical-quantity measuring device of the present embodiment shown in FIG. 21, the same number of amplifiers as sensors on the same chip of the mechanical-quantity measuring device are provided together with the sensors. Here, two sensors are connected to two amplifier circuits. In other respects, the circuits are of the same concept as the previous embodiment. In this manner, by providing not less than two sensors and the same number of amplifiers as the sensors on one chip, the sensors can be operated independently, therefore, there is no need to switch over the sensors by switching operations, as a result, the advantage that high-speed measurement can be performed is obtained. Further, in the case where there is the sensor not used depending on the application, the power source of the sensor and the amplifier can be shut off, thereby power consumption is reduced. In the ordinary application which connects and uses general sensors and amplifiers, some chips in which a plurality of sensors and amplifiers are built into one chip are found here and there, its advantage is a low cost. However, in the present embodiment, more advantages are obtained. That is, by providing a plurality combination of sensor and amplifier which detect strains in one chip, the adhering angle of each sensor becomes precise, so that the measurement can be performed with high precision. Further, by providing in one chip, therefore, each sensor is arranged on small place, as a result, the multiaxial strain components of the stress concentration field in small area can be measured with high precision.

Inside the amplifiers 20 and 21, resistors 22 and 23 are formed, respectively, and for example, formed by polycrystalline silicon doped with impurities. Further, a transistor 25 is also formed, and by combining these transistors with the resistors 22 and 23, amplifiers are formed. Here, the longitudinal directions of the resistors 22 and 23 are arranged all in the same direction, and, arranged in parallel with the longitudinal directions of the diffusion resistors 4a, 4b, 4c, and 4d composing the strain detection unit 3, and arranged vertical to the longitudinal directions of the diffusion resistors 5a, 5b, 5c, and 5d.

As shown in the present embodiment, by forming the bridge circuits 4 and 5 and the amplifiers 20 and 21 on the same semiconductor chip, noises are hard to enter and the mechanical-quantity measuring device capable of performing the measurement with high precision is provided. Further, the output of the bridge circuit can be amplified on the chip in the nearest distance, therefore, a noise tolerance further improved. Further, due to smallness of the bridge circuit, a magnetic flux is hard to pass through, and this makes the mechanical-quantity measuring device itself also tough against external noise.

Figure 22:
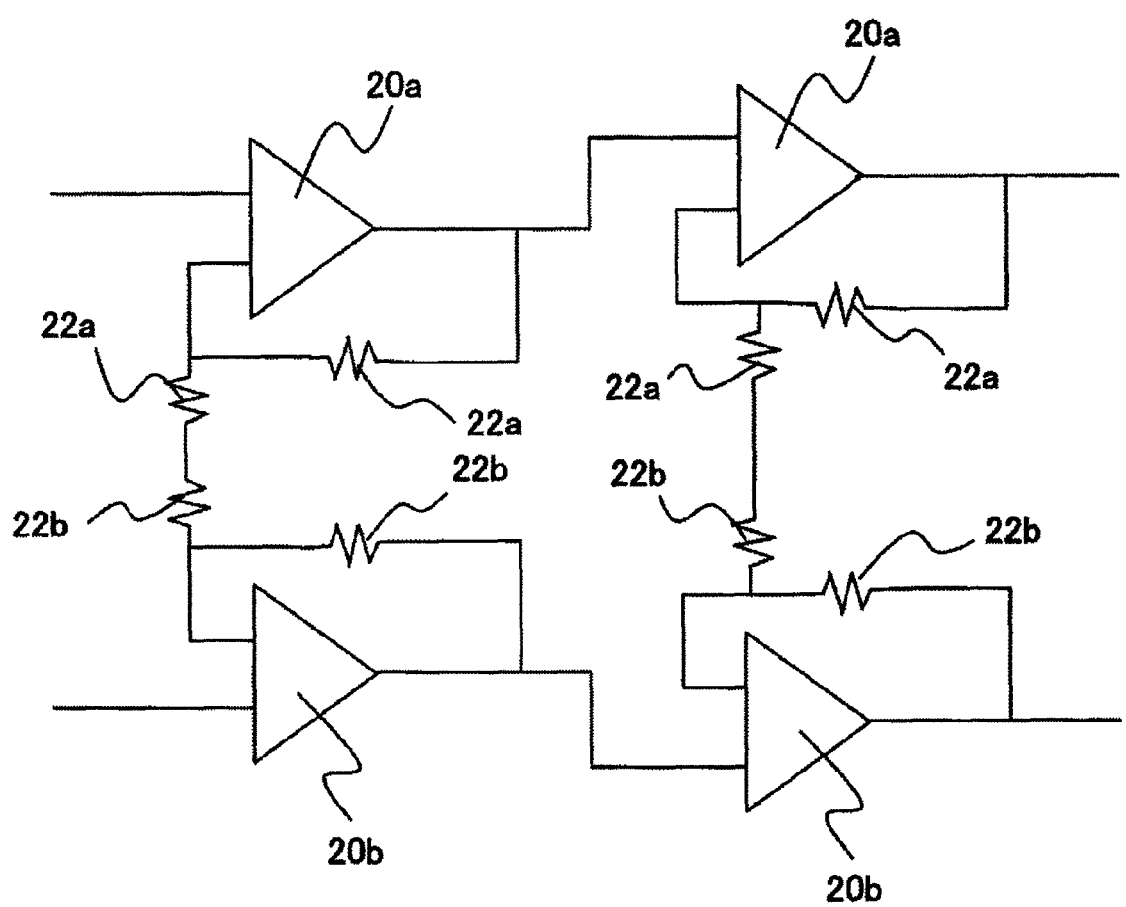
FIG. 22 is a schematic view showing an example of an amplifier circuit according to the seventh embodiment of the present invention.

As shown in FIG. 22, in the amplifier circuit, two outputs from the sensor are preferably input into amplifiers 20a and 21a respectively, and in that case, by arranging resistors 22a and 22b made of the polycrystalline silicon resistor connected to the two amplifiers 20a and 20b in line-symmetrical, respectively, the influences of the strains for the two polycrystalline silicon resistors 22a and 22b can be the same. As a result, the influences of the strains in the amplifier circuit are cancelled out to some extent, therefore, the mechanical-quantity measuring device capable of measuring with high precision is provided. That is, the resistors 22a and 22b of two amplifiers 20a and 20b connected to both outputs of the sensor are arranged approximately line-symmetrical, and though not illustrated, even when the resistors of amplifier not in line-symmetry exist, the longitudinal directions thereof are arranged and aligned in the same direction. By using the two amplifiers 20a and 20b in this manner, and arranging the resistors connected to them are approximately line-symmetrical, even if strains are loaded in the polysilicon part of the resistors of the amplifier, variation for the strains of the resistors 22a and 22b which make a pair arranged approximately line-symmetrical becomes equal, therefore, the advantage that the errors are reduced is obtained. That is, by arranging the resistors 22a and 22b approximately line-symmetrical, the strains in the same direction and magnitude are loaded on the resistors 22a and 22b, and therefore, the influences to gains of two amplifiers caused by the strains become also equal. Hence, the amplifier of one side only is not changed in gain by the strain of the other direction, and its correction is easy.

Usually, in a sensing circuit, the amplification by the amplifier is performed. Because this amplification has a common-mode rejection effect, that is, when noises are mixed in the signal lines connected to the sensor, the same amount of noises remain in the signal lines of both electrodes, therefore, these noises can removed. So, the amplification by the amplifier is used for noise reduction measure. In the present invention, in addition to this effect, the effect of reducing the influences by such strains is obtained.

More preferably, the axis of the line-symmetry of the chip and the axis of the line-symmetry of the resistors 22a and 22b are preferably identical. In the case where the chip is attached and a large strain is loaded on the chip, its deformation becomes line-symmetrical with the center line as an axis of symmetry, therefore, by arranging the resistors 22a and 22b also in symmetry for the axis of line-symmetry, the advantage that the influences by the strains of the resistors 22a and 22b are made the same even if the chip is sharply deformed is obtained.

Further, even if the output from the sensor is not input to the two amplifiers, by using the polycrystalline silicon as the resistor to be connected to the amplifier circuit, and aligning all the longitudinal directions of the polycrystalline silicon resistors to the same direction, a sufficient effect as amplifier circuit is obtained, though the effect may be cut lower than the case where a plurality of amplifiers are used. That is, the polycrystalline silicon resistor is made to have sensitivity for strain in its direction only, and separating each strain in the biaxial strain field by calculation become easy, as a result, the mechanical-quantity measuring device capable of measuring with relatively high precision is provided.

Further, in the amplifier circuit using an amplifier connected to the bridge circuit on the semiconductor chip, by providing the function to change the length of the resistor made of the polycrystalline silicon connected to the amplifier and the function to change the number of connections of the resistor, the mechanical-quantity measuring device capable of changing the gain of the amplifier circuit is provided.

In this case, the resistor for low gain is preferably arranged at the position of chip inner than the resistor for high gain. As a result, the influences of variation in sensitivity for the polycrystalline silicon in the case where the low gain amplifier used can be reduced to the minimum.

Further, in the present embodiment and the flowing embodiments, though a description has been made on the case with two pieces of sensors and two pieces of amplifiers, even when the number of pieces is not less than two, the embodiments can be equally applied. Further, even in the case where a plurality of sensors and one piece of amplifier are provided inside the same chip, with respect to the arrangement and circuit of the resistor of the amplifier, by arranging according to the present embodiment, the advantage that the measurement can be similarly performed with high precision is obtained.

Further, in the present embodiment, though the directions of the longitudinal directions of the resistors made of the polycrystalline silicon connected to the amplifier are preferably all aligned, part of the directions may be different, depending on the amplifier circuit, and the symmetry thereof may be collapsed. However, even in that case, the effects described in the present embodiment are still available, though reduced. And, in the present embodiment, though a description has been made assuming that the resistors connected to the amplifier circuit are made of the polycrystalline silicon, they may be the diffusion resistors of the semiconductor, and the same effect can be obtained.

Further, as shown in FIG. 21, the bridge circuit 4 and the bridge circuit 5 are provided so as to be as much at a center of the chip as possible, and a transistor 25 of the amplifier may be provided close to the chip end. That is, the transistor 25 relatively not so sensitive to the strain is provided at the chip end, so that the highly precise measurement can be realized. That is, the distance between the diffusion layers of the bridge circuit 4 and the diffusion layers of the bridge circuit 5 is provided shorter than the distance between the transistor of the amplifier connected to the bridge circuit 4 and the transistor connected to the bridge circuit 5, therefore, the highly precise measurement can be performed.

[Eighth Embodiment]
<Chip with Amplifier>

Figure 23:
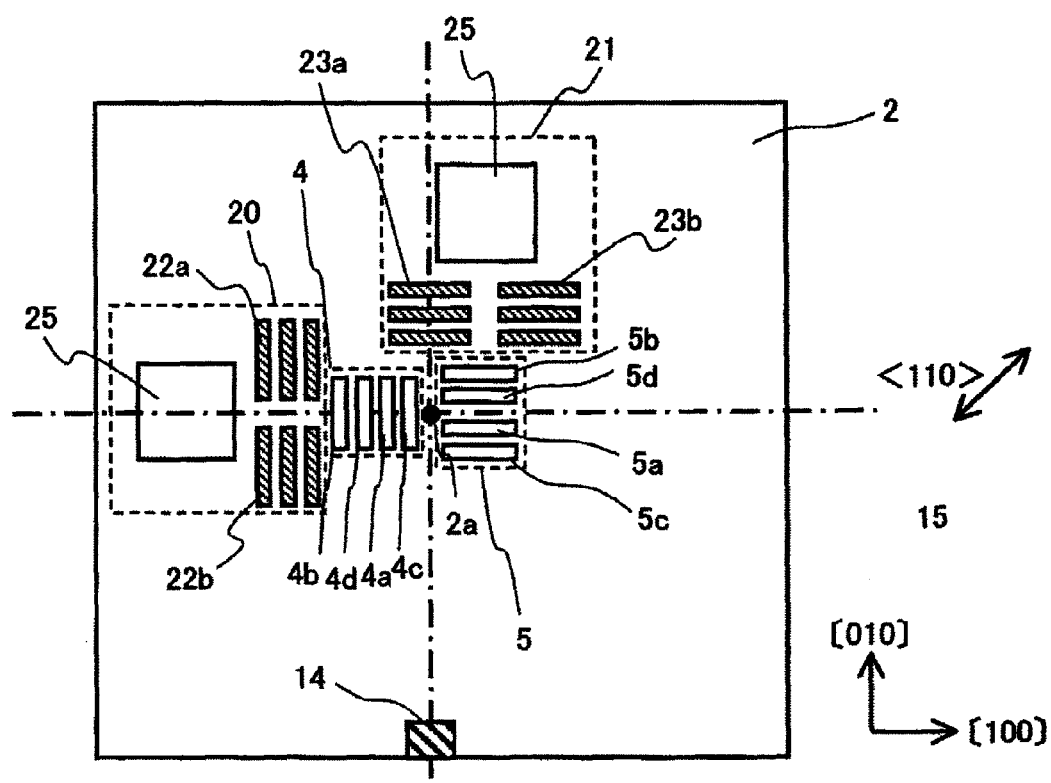
FIG. 23 is a schematic view showing the detail of a mechanical-quantity measuring device according to an eighth embodiment of the present invention.

Next, an eighth embodiment in the present invention will be described using FIG. 23. FIG. 23 shows main parts of a mechanical-quantity measuring device by the eighth embodiment, and the same reference symbols are attached to the parts common with other embodiments.

The mechanical-quantity measuring device of the present embodiment shown in FIG. 23 is the same as the mechanical-quantity measuring device according to the seventh embodiment shown in FIG. 22 in the point that amplifiers 20 and 21 are formed on the same chip, and the same effect can be obtained.

In the present embodiment, resistor groups 22a, 22b and 23a, 23b composing the amplifiers 20 and 21 are arranged in rotation symmetry with a center of the chip as an axis of rotation. In this case, since a bridge circuit 5 and the amplifier 21 have quite equivalent structures with a bridge circuit 4 and the amplifier 20 turned 90 degrees, the advantage that the design is easy is obtained. Further, since the resistors 22a and 22b in contact with the bridge circuit 4 are directed in the same direction, the influences from the strains of the resistor 22a and 22b can be made the same and cancelled out by an amplifier, so that the influences of the strains can be reduced.

[Ninth Embodiment]
<Chip with Amplifier>

Figure 24:
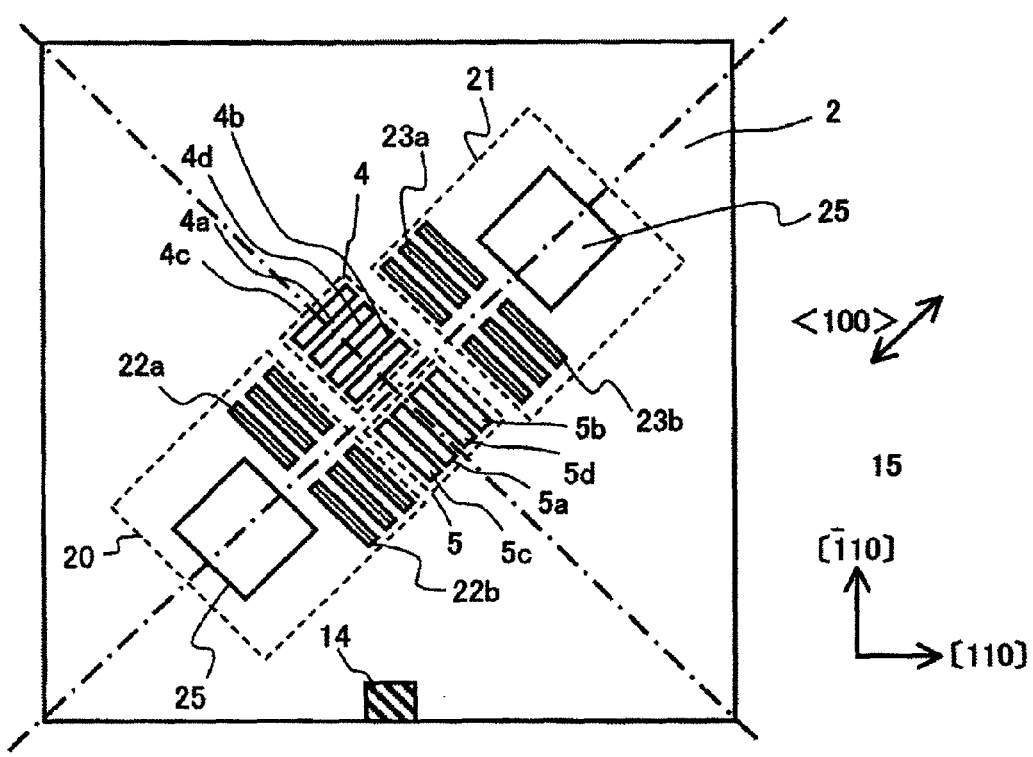
FIG. 24 is a schematic view showing the detail of a mechanical-quantity measuring device according to a ninth embodiment of the present invention.

Next, a ninth embodiment in the present invention will be described using FIG. 24. FIG. 24 shows main parts of a mechanical-quantity measuring device according to the ninth embodiment, and the same reference symbols are attached to the parts common with other embodiments.

In the mechanical-quantity measuring device of FIG. 21 according to the seventh embodiment, while each side is in parallel with a <100> direction, and is square-shaped, in the mechanical-quantity measuring device of the present embodiment shown in FIG. 24, each side is in parallel with a <110> direction, and is square-shaped. In other respects, both of the devices are of the same structure, and by arranging the amplifier on the same chip as the mechanical-quantity measuring device, the same effect as the seventh embodiment can be also obtained.

In the amplifiers 20 and 21, resistors 22a, 22b, and 23a, 23b are formed, and for example, by polycrystalline silicon doped with impurities. Here, the longitudinal directions of the resistors 22a, 22b, and 23a, 23b are arranged to be all in the same direction, and moreover, are vertical to the longitudinal directions of the diffusion resistors 4a to 4d composing the bridge circuit 4, and in parallel to the longitudinal directions of the diffusion resistors 5a to 5d composing the bridge circuit 5.

By arranging the amplifiers 20 and 21 in parallel with the arrangement of the bridge circuits 4 and 5, that is, in parallel with a diagonal line, the strain measuring direction and the arranging direction of the feedback resistor are the same, and therefore, the advantage that the measurement direction of the strain can be easily known is obtained. Further, by providing the bridge circuits side by side, and providing the resistors 22a, 22b and 23a, 23b of the amplifier so as to be adjacent to both sides of the bridge circuits 4 and 5, an installing space of the bridge circuit 4, 5 and the resistors 22a, 22b, 23a, and 23b of the amplifier can be small.

[Tenth Embodiment]
<Chip with Amplifier>

Figure 25:
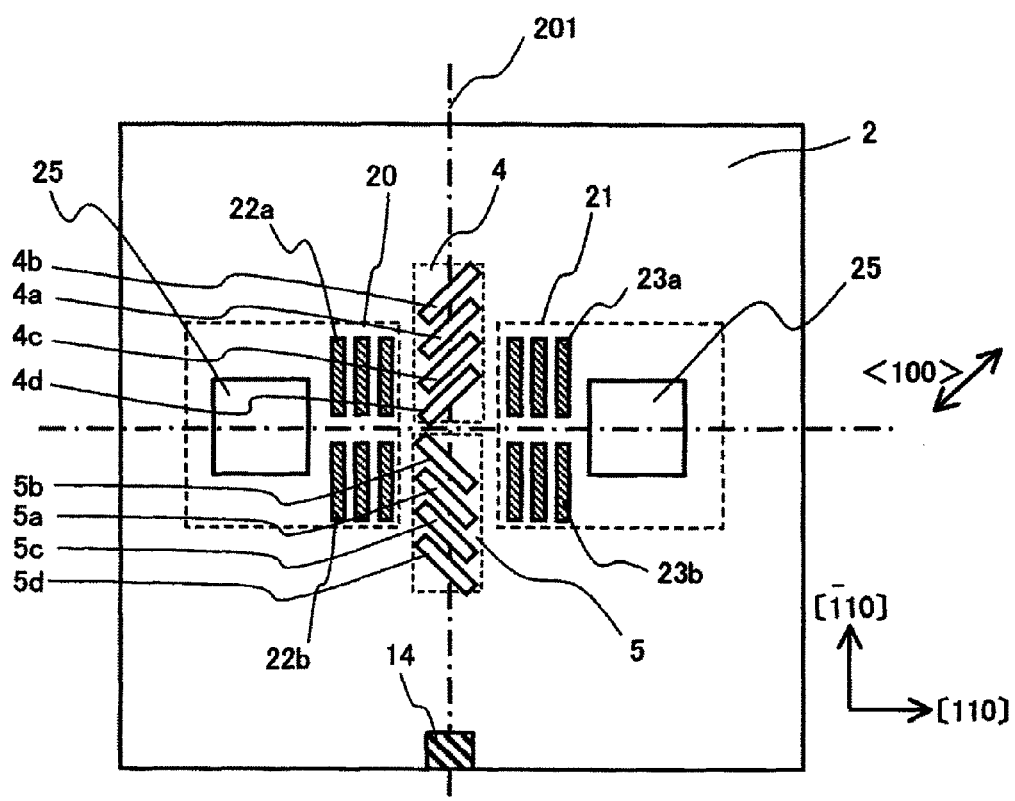
FIG. 25 is a schematic view showing the detail of a mechanical-quantity measuring device according to a tenth embodiment of the present invention.

Next, a tenth embodiment in the present invention will be described using FIG. 25. FIG. 25 shows main parts of a mechanical-quantity measuring device according to the tenth embodiment.

The mechanical-quantity measuring device of FIG. 25 according to the present embodiment has a structure of the ninth embodiment shown in FIG. 24, with the arrangement of bridge circuits 4 and 5 and amplifiers 20 and 21 modified. In the other respects, it has the same structure, and the same effect of the above described embodiments can be obtained.

In the tenth embodiment shown in FIG. 24, while the bridge circuits 4 and 5 are arranged in a line along the diagonal line of a chip, in the present embodiment shown in FIG. 25, the bridge circuits 4 and 5 are arranged along a center line of the chip. Further, the center of diffusion resistors 4a to 4d and 5a to 5d composing the bridge circuits 4 and 5 are arranged in a line along the center line of the chip. The diffusion resistors 4a to 4d forming the bridge circuit 4 have the longitudinal directions thereof directed to a [100] direction which is the measuring direction of the bridge circuit 4, and the diffusion resistors 5a to 5d forming the bridge circuit 5 have the longitudinal directions thereof directed to a [010] direction which is the measuring direction of the bridge circuit 5, and each directions are orthogonal to each other. Further, all diffusion resistor is directed to the direction making 45 degree to the chip edge directed to the <110> and the center line. The center of each of the diffusion resistor 4a to 4d is lined up in the direction making 45 degree to the longitudinal directions of the diffusion resistors 4a to 4d, and each of the center of the diffusion resistors 5a to 5d is lined up in the direction making 45 degree to the longitudinal directions of the diffusion resistors 5a to 5d, and the centers of the diffusion resistors 4a to 4d and the diffusion resistors 5a to 5d are lined up in a line, therefore, the region occupied by the bridge circuits 4 and 5 is made to be oblong and compact.

Further, the longitudinal directions of the resistors 22a, 22b, and 23a, 23b formed inside the amplifiers 20 and 21 are all provided in parallel with the center line of the chip, that is, in parallel with the <110> direction. At one side each of the bridge circuits 4 and 5, the resistors 22a and 22b of the amplifier are provided, and at the opposite sides of the bridge circuits, the resistors 23a and 23b of the amplifier are provided.

In the present embodiment, since the bridge circuit can be made oblong and formed compact, even in the case where the amplifier is arranged, an occupying area of the amplifier can be larger. Hence, chip area can be much smaller, therefore, the cost thereof can be reduced. In addition, the amplifier with high gain, prone to be large in occupying area; can be loaded. Further, by arranging the sensor and the amplifier in this manner, the advantage that the pulling around of the wires between the sensor and the amplifier can be made easy is obtained.

[Eleventh Embodiment]
<Position of Strain Detection Unit>

Figure 26:
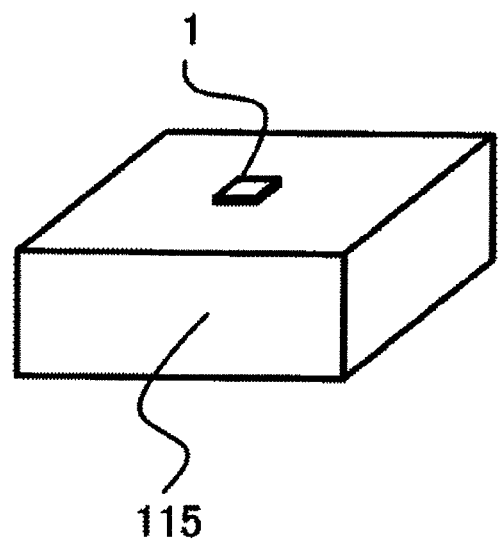
FIG. 26 is a schematic view showing an attaching state of the mechanical-quantity measuring device of the present invention.
Figure 26:
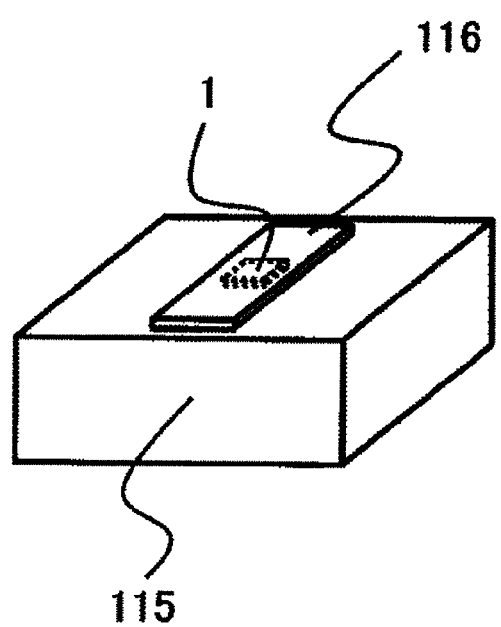

As shown in FIG. 26, in the case where the mechanical-quantity measuring device 1 is adhered to a measured object 115 or is connected to it through another plate to perform a strain measurement, the side surface of a silicon substrate 2 becomes a free surface, therefore, a restraint a silicon substrate 2 and an measure object 11 for the direction in parallel with a boundary surface become weak. In other words, there was a fear that the trackability of the strain for the measured object becomes worse in the vicinity of the periphery portion of a silicon substrate 2. Hence, the inventor and others of the present application have found that variation in sensitivity can be reduced by limiting the place to arrange the sensor on the chip by a finite element method analysis.

Figure 27:
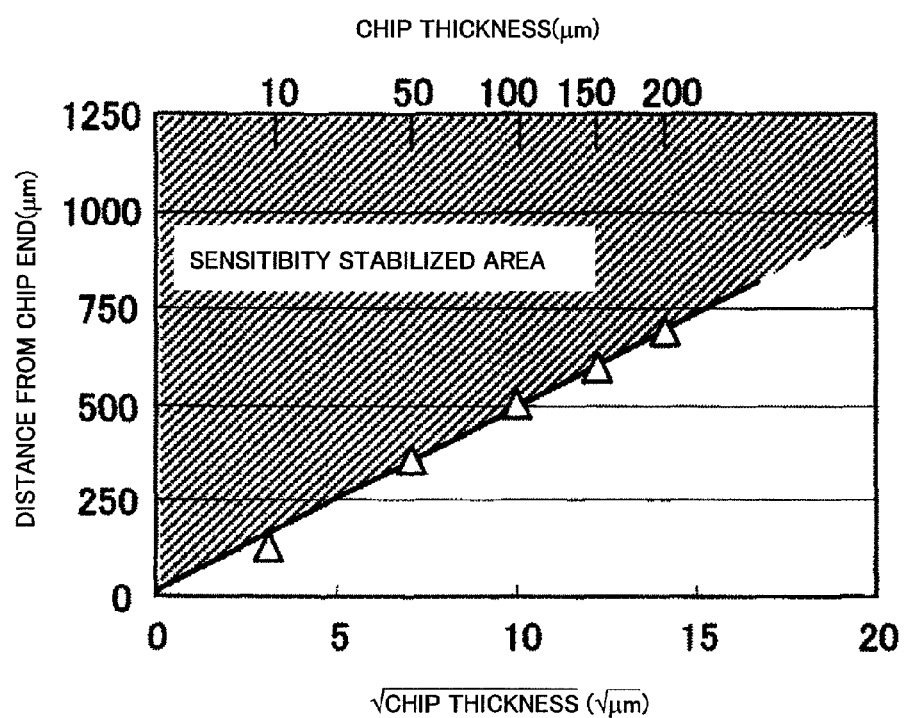
FIG. 27 is a schematic view showing the optimal shape of a mechanical-quantity measuring device according to an eleventh embodiment of the present invention.

A result of the study on effect of the chip thickness the distance from the chip ends to sensitivity for strain is shown in FIG. 27. As a result, to stabilize the sensitivity for strain, the strain detection unit 3 is required to be arranged at a chip center portion, and as the chip thickness of the mechanical-quantity measuring device 1 becomes thicker, the distance from the chip end is required to be longer. As a result of the study on the area in which the sensitivity is stabilized, it was revealed that, by arranging the strain detection unit 3 at least not less than $49 \times (chip)^{0.5}$ μm inside from the chip end 3, variation in sensitivity can be controlled.

As a result, even in the case where the mechanical measuring device 1 composed of the semiconductor chip is adhered to the measured object, variation in the measurement can be reduced, not receiving the influences of the chip ends, and the measurement with extremely good reproducibility and high precision can be performed.

What is claimed is:

1. A mechanical-quantity measuring device provided with a strain detection unit on a semiconductor substrate surface and attached to a measured obiect to measure a strain comprising a first sensor and a second sensor,
    wherein the first and second sensors are located on the same semiconductor substrate surface,
    wherein the first sensor and the second sensor comprise respectively, two pieces of n-type impurity diffusion resistors in which a current flows in a <100> direction, mutually provided in parallel and forming a resistor of the opposite side of a Wheatstone bridge, and two pieces of p-type diffusion resistors in which a current flows in a <100> direction and forming the resistors of the Wheatstone bridge,
    wherein the current flow direction of two pieces of the n-type impurity diffusion resistors of the first sensor is orthogonal to the current flow direction of two pieces of the n-type impurity diffusion resistors of the second sensor.

2. The mechanical-quantity measuring device according to claim 1,
    wherein two pieces of the n-type impurity diffusion resistors of the first sensor are formed approximately line-symmetrical with two pieces of the n-type impurity diffusion resistors of the second sensor.

3. The mechanical-quantity measuring device according to claim 2,
    wherein the line to be axis of approximately line symmetrical passes through a center point of the main surface of the semiconductor substrate.

4. The mechanical-quantity measuring device according to claim 1,
    wherein the longitudinal direction of two pieces of the p-type impurity diffusion resistors of the first sensor is orthogonal to the longitudinal direction of two pieces of the p-type impurity diffusion resistors of the second sensor, and are formed approximately line-symmetrical.

5. The mechanical-quantity measuring device according to claim 1,
    wherein two pieces of the p-type impurity diffusion resistors of the first sensor are approximately in parallel with two pieces of the p-type impurity diffusion resistors of the second sensor.

6. The mechanical-quantity measuring device according to claim 1,
    wherein the n-type impurity diffusion resistor of the first sensor is arranged at a position closer to the centroid of the semiconductor substrate main surface than the p-type impurity diffusion resistor of the first sensor.

7. The mechanical-quantity measuring device according to claim 1,
    wherein the distance between the n-type impurity diffusion resistor of the first sensor and the n-type impurity diffusion resistor of the second sensor is shorter than the distance between the p-type impurity diffusion resistor of the first sensor and the p-type impurity diffusion resistor of the second sensor.

8. A mechanical-quantity measuring device provided with a strain detection unit on a semiconductor substrate surface and attached to a measured object to measure a strain comprising a first sensor and a second sensor,
    wherein the first sensor and the second sensor comprise two pieces of diffusion resistors with high sensitivity for strain provided in parallel, and two pieces of diffusion resistors with low sensitivity for strain, respectively, and
    wherein the longitudinal direction of two pieces of the diffusion resistors with high sensitivity for strain of the first sensor is orthogonal to the longitudinal direction of two pieces of the diffusion resistors with high sensitivity for strain of the second sensor, and, two pieces of the diffusion resistors with high sensitivity for strain of the first sensor and two pieces of the diffusion resistors with high sensitivity for strain of the second sensor are formed approximately line-symmetrical.

* * * * *